(12) United States Patent
Arai

(10) Patent No.: US 12,135,192 B2
(45) Date of Patent: Nov. 5, 2024

(54) TRAJECTORY ESTIMATION DEVICE, TRAJECTORY ESTIMATION SYSTEM, TRAJECTORY ESTIMATION METHOD, AND PROGRAM RECORDING MEDIUM

(71) Applicant: NEC Corporation, Tokyo (JP)

(72) Inventor: Yumi Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/034,608

(22) PCT Filed: Nov. 16, 2020

(86) PCT No.: PCT/JP2020/042632
§ 371 (c)(1),
(2) Date: Apr. 28, 2023

(87) PCT Pub. No.: WO2022/102133
PCT Pub. Date: May 19, 2022

(65) Prior Publication Data
US 2024/0003660 A1    Jan. 4, 2024

(51) Int. Cl.
*F41G 7/34*    (2006.01)
(52) U.S. Cl.
CPC .................... *F41G 7/343* (2013.01)
(58) Field of Classification Search
CPC ................... F41G 7/343; G01S 5/18
See application file for complete search history.

(56) References Cited

U.S. PATENT DOCUMENTS 5,241,518 A * 8/1993 McNelis ............... G01S 5/18
367/906
5,781,505 A * 7/1998 Rowland .............. G01S 5/18
367/906

(Continued)

FOREIGN PATENT DOCUMENTS

JP    H01-136081 A    5/1989
JP    H7-505219 A    6/1995

(Continued)

OTHER PUBLICATIONS

International Search Report for PCT Application No. PCT/JP2020/042632, mailed on Jan. 12, 2021.

(Continued)

*Primary Examiner* — Bernarr E Gregory
(74) *Attorney, Agent, or Firm* — Sughrue Mion, PLLC

(57) ABSTRACT

A trajectory estimation device that includes a waveform generation unit that generates, by using signals based on waves detected by at least three sensors, peak waveforms consisting of time series data of peak frequencies of the signals, a parameter estimation unit that estimates, from the peak waveforms relating to the waves detected by the at least three sensors, a trajectory parameter relating to a trajectory of a moving body having a wave source of the waves, and a trajectory estimation unit that estimates, for all combinations of two of the peak waveforms selected from among combinations of at least three of the peak waveforms, a wave source direction candidate for each of the waves by using the trajectory parameter, and estimate, as a trajectory of the moving body, overlapping trajectory candidates from among trajectory candidates estimated based on the wave source direction candidates.

10 Claims, 25 Drawing Sheets

(56) References Cited

U.S. PATENT DOCUMENTS

| | | | | |
|---|---|---|---|---|
| 5,930,202 | A * | 7/1999 | Duckworth | G01S 5/20 367/906 |
| 6,956,523 | B2 * | 10/2005 | Mohan | G01S 13/003 342/464 |
| 8,149,156 | B1 * | 4/2012 | Allred | G01S 13/583 342/146 |
| 8,320,217 | B1 * | 11/2012 | Barger | G01S 3/8086 367/127 |
| 8,437,223 | B2 * | 5/2013 | Barger | G01S 3/801 367/129 |
| 2007/0033045 | A1 * | 2/2007 | Smaragdis | G10L 21/028 704/E21.013 |
| 2007/0230269 | A1 * | 10/2007 | Ledeczi | G01S 5/0081 367/117 |
| 2011/0110195 | A1 | 5/2011 | Hall | |
| 2019/0096256 | A1 * | 3/2019 | Rowell | G01S 15/931 |

FOREIGN PATENT DOCUMENTS

| | | |
|---|---|---|
| JP | 2000-205794 A | 7/2000 |
| JP | 2007-033445 A | 2/2007 |
| JP | 2015-118004 A | 6/2015 |

OTHER PUBLICATIONS

English translation of Written opinion for PCT Application No. PCT/JP2020/042632, mailed on Jan. 12, 2021.

* cited by examiner

TRAJECTORY ESTIMATION DEVICE, TRAJECTORY ESTIMATION SYSTEM, TRAJECTORY ESTIMATION METHOD, AND PROGRAM RECORDING MEDIUM

This application is a National Stage Entry of PCT/JP2020/042632 filed on Nov. 16, 2020, the contents of all of which are incorporated herein by reference, in their entirety.

TECHNICAL FIELD

The present disclosure relates to a trajectory estimation device or the like that estimates a trajectory of a moving body.

BACKGROUND ART

By using a microphone array including a plurality of microphones, the direction of the sound source can be estimated by the arrival time difference of the sound waves emitted from the sound source. For example, by regarding the position of the sound source at regular time intervals as stationary, the position of the moving sound source can be estimated. In estimation of a sound source direction using a general microphone array, in order to avoid spatial aliasing distortion, a distance between microphones constituting the microphone array is set to be smaller than a value obtained by dividing a sound speed by twice a frequency of a sound wave. When the sound source moves, it is necessary to install a plurality of microphone arrays in a wide range.

PTL 1 discloses a bullet position locating device that estimates a falling position and the like of a high-speed flying object such as a bullet. The device of PTL 1 estimates a fall position and the like of the high-speed flying object based on an arrival time difference of a projectile firing sound and the like observed by a plurality of sensors. In the method of PTL 1, the projectile firing position is estimated using the Doppler shift of the flight sound of the projectile at the position of the sensor calculated using the optimum ballistic calculation value calculated in advance.

PTL 2 discloses a method for determining a trajectory of a supersonic projectile whose speed and direction are unknown. In the method of PTL 2, shock waves generated by the supersonic projectile passing near at least three sensors disposed at intervals on the same plane are observed. Each sensor outputs a signal relating to an azimuth angle and an elevation angle of a unit aiming vector to a shock wave source in response to the shock wave. In the method of PTL 2, the azimuth angle and the elevation angle of a local trajectory of the projection object are calculated from unit aim vectors of three sensors.

CITATION LIST

Patent Literature

PTL 1: JP 2000-205794 A
PTL 2: JP 7-505219 A

SUMMARY OF INVENTION

Technical Problem

In the estimation of the sound source direction using a general microphone array, in a case where the sound source moves, a plurality of microphone arrays is installed in a wide range, so that a large number of microphones are required and cost is increased. In the estimation of the sound source direction using a general microphone array, since the section in which the position of the sound source can be regarded as stationary is short, a sufficient amount of data for the estimation cannot be obtained, and the estimation accuracy decreases.

In the method of PTL 1, in order to estimate an accurate bullet firing position, a final bullet firing position is estimated by repeating a ballistic calculation and a calculation of a Doppler shift value of a flying sound. In the method of PTL 1, since the position cannot be specified following the movement of the wave source, it is not possible to estimate the temporal change or speed (hereinafter, referred to as a trajectory) of the position of the wave source.

The method of PTL 2 can be applied to calculation of a trajectory of a moving body that moves at a supersonic speed enough to generate a shock wave. However, in the method of PTL 2, it is not possible to calculate the trajectory of the moving body having the wave source based on the wave from the wave source that moves at a speed at which no shock wave is generated.

An object of the present disclosure is to provide a trajectory estimation device and the like capable of estimating a trajectory of a moving body having a wave source.

Solution to Problem

A trajectory estimation device according to an aspect of the present disclosure that includes a waveform generation unit that generating, by using signals based on waves detected by at least three sensors, peak waveforms consisting of time series data of peak frequencies of the signals, a parameter estimation unit that estimates, from the peak waveforms relating to the waves detected by the at least three sensors, a trajectory parameter relating to a trajectory of a moving body having a wave source of the waves, and a trajectory estimation unit that estimates, for all combinations of two of the peak waveforms selected from among combinations of at least three of the peak waveforms, a wave source direction candidate for each of the waves by using the trajectory parameter, and estimate, as a trajectory of the moving body, overlapping trajectory candidates from among trajectory candidates estimated based on the wave source direction candidates.

A trajectory estimation method according to an aspect of the present disclosure causes a computer to execute generating, by using signals based on waves detected by at least three sensors, peak waveforms consisting of time series data of peak frequencies of the signals, estimating, from the peak waveforms relating to the waves detected by the at least three sensors, a trajectory parameter relating to a trajectory of a moving body having a wave source of the waves, estimating, for all combinations of two of the peak waveforms selected from among combinations of at least three of the peak waveforms, a wave source direction candidate for each of the waves by using the trajectory parameter, and estimating, as a trajectory of the moving body, overlapping trajectory candidates from among trajectory candidates estimated based on the wave source direction candidates.

A program according to an aspect of the present disclosure causes a computer to execute generating, by using signals based on waves detected by at least three sensors, peak waveforms consisting of time series data of peak frequencies of the signals, estimating, from the peak waveforms relating to the waves detected by the at least three sensors, a trajectory parameter relating to a trajectory of a moving body having a wave source of the waves, estimating, for all combinations of two of the peak waveforms selected from among combinations of at least three of the peak waveforms, a wave source direction candidate for each of the waves by using the trajectory parameter, and estimating, as a trajectory of the moving body, overlapping trajectory candidates from among trajectory candidates estimated based on the wave source direction candidates.

Advantageous Effects of Invention

According to the present disclosure, it is possible to provide a trajectory estimation device and the like capable of estimating a trajectory of a moving body having a wave source.

EXAMPLE EMBODIMENT

Figure 1:
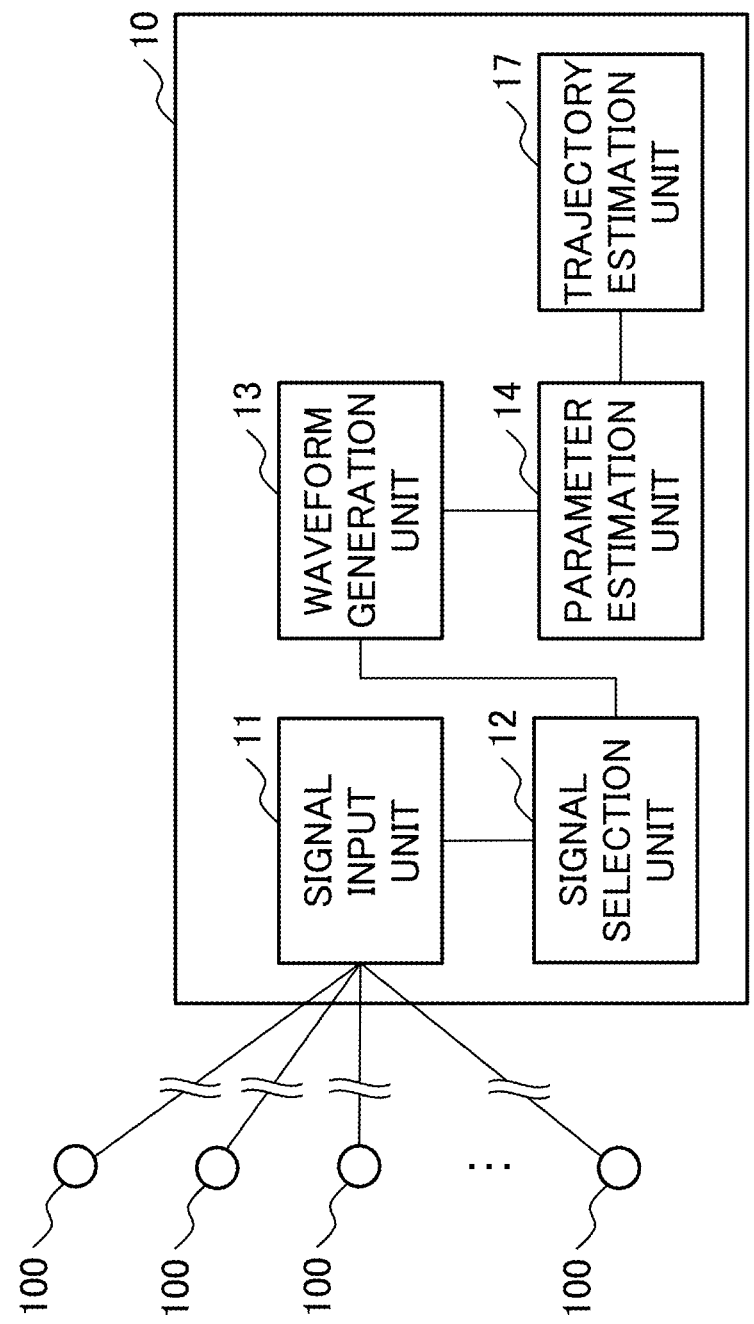
FIG. 1 is a block diagram illustrating an example of a configuration of a trajectory estimation device according to a first example embodiment.

Hereinafter, embodiments of the present invention will be described with reference to the drawings. However, the example embodiments described below may be technically limited for carrying out the present invention, but the scope of the invention is not limited to the following. In all the drawings used in the following description of the example embodiment, the same reference numerals are given to the same parts unless there is a particular reason. In the following example embodiments, repeated description of similar configurations and operations may be omitted.

First Example Embodiment

First, a trajectory estimation device according to a first example embodiment will be described with reference to the drawings. The trajectory estimation device of the present example embodiment estimates a temporal change and a velocity (hereinafter, referred to as a trajectory) of a position of a moving body that moves while emitting waves based on the waves detected by a plurality of sensors. In the present example embodiment, a trajectory of a moving body having a wave source that emits waves of a single frequency band is estimated. The frequency band of the wave detected by the sensor is a bandwidth in which a change due to the Doppler effect can be detected. In the present example embodiment, an example of estimating a trajectory of a single moving body having one wave source that emits waves of a single frequency will be mainly described.

(Configuration)

FIG. 1 is a block diagram illustrating an example of a configuration of a trajectory estimation device 10 according to the present example embodiment. The trajectory estimation device 10 includes a signal input unit 11, a signal selection unit 12, a waveform generation unit 13, a parameter estimation unit 14, and a trajectory estimation unit 17.

The trajectory estimation device 10 is connected to a plurality of sensors 100 arranged at intervals. For example, in a case where the wave source of the moving body, which is an estimation target of the trajectory, is a sound source, the sensor 100 can be achieved by a microphone. For example, in a case where the wave source of the moving body, which is the trajectory estimation target, is a vibration source, the sensor 100 can be achieved by a vibration sensor. The sensor 100 is not limited to a microphone or a vibration sensor as long as it can detect a wave generated by a wave source. A system including the trajectory estimation device 10 and the plurality of sensors 100 is also referred to as a trajectory estimation system.

The signal input unit 11 inputs a signal based on the waves detected by the plurality of sensors 100. The signal input unit 11 acquires the position of the sensor 100 capable of detecting the wave from the wave source. In a case where the position of the sensor 100 capable of detecting the wave from the wave source is registered in advance in the trajectory estimation device 10, the signal input unit 11 acquires the position of the sensor 100 registered in advance. The signal input unit 11 may be connected to the plurality of sensors 100 in a wired manner or in a wireless manner. For example, the signal input unit 11 may be connected to the plurality of sensors 100 via a network (not illustrated).

Figure 2:
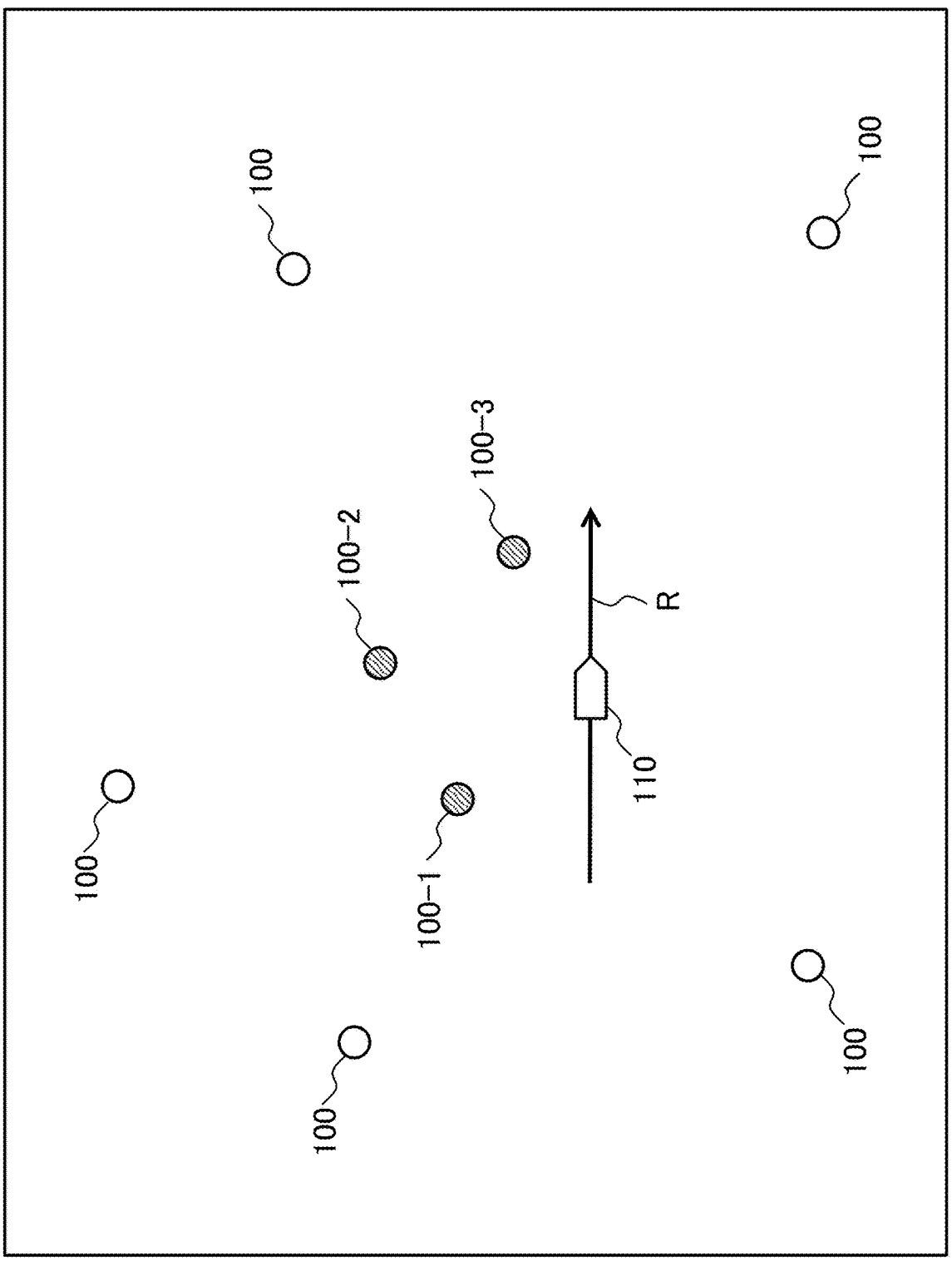
FIG. 2 is a conceptual diagram for explaining an example of arrangement of a plurality of sensors that detects a wave input to the trajectory estimation device according to the first example embodiment.

FIG. 2 is a conceptual diagram illustrating an arrangement example of the plurality of sensors 100. In a space where the plurality of sensors 100 are arranged, a moving body 110 having a wave source that emits a wave of a single frequency moves. The plurality of sensors 100 are arranged at intervals according to the type of the moving body 110 that is an estimation target of the trajectory. When the individual sensors 100 are distinguished, identification numbers are added to the ends of the reference numerals of the sensors 100. For example, the sensor 100 having an identification number m is described as a sensor 100-*m* (m is a natural number). In FIG. 2, the sensors 100 denoted by the sensors 100-1 to 3, and the sensors 100 denoted by the identification numbers 1 to 3 indicate the sensors 100. Each sensor 100 is disposed at a preset interval. The interval between the sensor 100-*m* and the sensor 100-*n* is denoted as $k_{mn}$ (k is a positive real number, and n is a natural number). The interval between the sensor 100-*m* and the sensor 100-*n* may be expressed as $k_{nm}$. For example, the interval between the sensor 100-1 and the sensor 100-2 is denoted as $k_{12}$, the interval between the sensor 100-1 and the sensor 100-3 is denoted as $k_{13}$, and the interval between the sensor 100-2 and the sensor 100-3 is denoted as $k_{23}$.

The plurality of sensors 100 may be arranged in any manner as long as the position of each sensor 100 can be specified. For example, the plurality of sensors 100 may be arranged at equal intervals or may be arranged at arbitrary intervals. The plurality of sensors 100 may change in positional relationship with each other as long as the position of each sensor 100 can be determined. For example, a microphone, a vibration sensor, or the like mounted on a mobile terminal that can specify position information by a global positioning system (GPS) or the like may be used as the sensor 100. In the following description, it is assumed that the moving body 110 moves linearly at a constant velocity in a space in which the plurality of sensors 100 are arranged in a unit period used to estimate the trajectory of the moving body 110 having the wave source. A signal (also referred to as a signal section) of a unit period used for estimating the trajectory of the moving body 110 is referred to as a frame. The length of one frame is set as a time length in which the moving body 110 can be assumed to perform uniform linear motion, and is set shorter as the velocity of the moving body 110 is higher. For example, the length of the frame is set to several seconds.

The signal selection unit 12 selects signals from at least three sensors 100 estimated to be close to the moving body 110 from among the plurality of sensors 100. It is estimated that the sensor 100 estimated to be close to the moving body 110 detects a wave from a wave source of the moving body 110. The signal selection unit 12 selects the sensor 100 used in a frame (also referred to as a verification frame) used for the current estimation based on the trajectory estimated in a frame (also referred to as a previous frame) used for the previous estimation. The signal selection unit 12 may be omitted in a case where it is not necessary to select the sensor 100 for a reason such as a case where there are only three sensors 100 capable of detecting the wave emitted from the wave source or a case where the movement distance from the previous frame is sufficiently small.

For example, the signal selection unit 12 calculates the distance moved from the position of the moving body 110 estimated in the previous frame to the current verification frame according to the elapsed time from the previous frame, and estimates the position of the moving body 110 in the verification frame. The signal selection unit 12 selects signals from at least three sensors 100 close to the estimated position of the moving body 110. In a case where the verification frame is the first frame, the signal selection unit 12 selects, for example, a signal having strong power, a signal having a high signal-to-noise ratio (SNR), a signal estimated to be the same, or the like. Alternatively, at least three sensors 100 having an earlier arrival time are selected. For example, after taking the deviation due to the Doppler shift into account, the signal selection unit 12 selects at least three sensors 100 in order from the sensor having the earlier start time among the plurality of sensors 100 that have detected the wave in the close frequency band. For example, the signal selection unit 12 may roughly estimate the position of the moving body 110 detected by radar, visible light, or the like based on a monitoring result of a device that monitors a place where the plurality of sensors 100 are arranged by radar, visible light, or the like, and select at least three sensors 100 close to the estimated position. For example, in a case where the rough position of the moving body 110 cannot be specified, the signal selection unit 12 may randomly select at least three sensors 100 among the plurality of sensors 100. The method of selecting the sensor 100 described above is an example, and the method of selecting the sensor 100 by the signal selection unit 12 is not limited.

The waveform generation unit 13 acquires at least three signals selected by the signal selection unit 12. The waveform generation unit 13 generates at least three frequency spectrograms using the acquired signal. For example, the waveform generation unit 13 performs Fourier transform on the acquired signal to convert the signal into a frequency domain signal. The waveform generation unit 13 generates a frequency spectrogram using the frequency domain signal for each frame. The frequency spectrogram is a three-dimensional graph representing the wave detected by each sensor 100 in a relationship of time, frequency, intensity, and the like. In the present example embodiment, in the frequency spectrogram, the time is set on the horizontal axis, the frequency is set on the vertical axis, and the intensity is indicated by shading. The frequency spectrogram represents what kind of frequency component and how much frequency component is included in the waveform sampled from the signal. Instead of the intensity, an amplitude or the like may be used.

Figure 3:
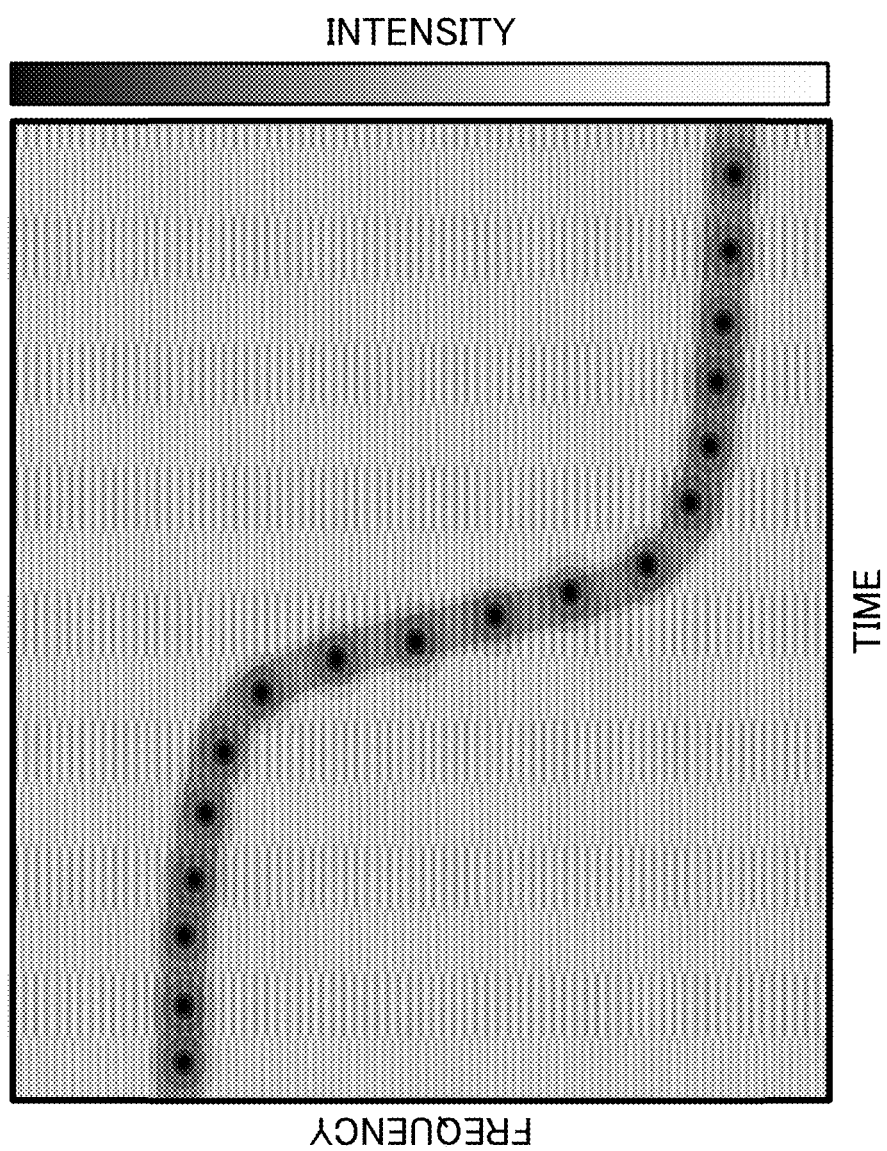
FIG. 3 is a conceptual diagram for explaining an example of a spectrogram generated by the trajectory estimation device according to the first example embodiment.

FIG. 3 is an example of a frequency spectrogram generated by the waveform generation unit 13. In FIG. 3, the intensity of the wave is represented by shading. However, the example of FIG. 3 conceptually illustrates the frequency spectrogram generated by the waveform generation unit 13, and is not generated based on the actually detected wave.

The waveform generation unit 13 generates time series data (also referred to as a peak waveform) of peak frequencies from the generated frequency spectrogram. The peak waveform is a temporal change in the frequency at which the intensity is maximized or maximized in the frequency spectrogram. The waveform generation unit 13 generates, as a peak waveform, a temporal change in frequency at which the intensity takes a maximum value or a local maximum value. For example, when a frequency at which the intensity takes a maximum value or a local maximum value at time t and the intensity exceeds a threshold is f(t), the peak waveform shows temporal changes such as f(0)=1000 hertz, f(1)=998 hertz, f(2)=996 hertz, and so on. For example, when there is no local maximum value at t=5, or when the intensity does not exceed the threshold at t=5, the frequency f(t=5) may be missing by this time. Among the peak waveforms extracted by the waveform generation unit 13, a waveform based on a signal from a wave source of a moving body that is an estimation target of the trajectory is referred to as a Doppler shift here. In the present example embodiment, since it is assumed that the moving body has a single wave source and a peak waveform caused by noise is not observed, all peak waveforms are related to the Doppler shift.

For example, in a case where the wave frequency is known in advance, the waveform generation unit 13 generates a frequency obtained by shifting the wave frequency within a certain frequency width as a bases. For example, it is assumed that the wave frequency is f hertz and the constant frequency width is 2α+1 hertz (f and α are real numbers). For example, the waveform generation unit 13 generates frequencies shifted to f−α, f−α+1, . . . , f, f+1, . . . , f+α as bases within a frequency width of frequency (f hertz)±α hertz of the wave. The waveform generation unit 13 obtains activations for all the bases by non-negative matrix factorization (NMF), and specifies a base whose activation takes the maximum value. The waveform generation unit 13 generates a peak waveform in which the frequency of the base at which the activation takes the maximum value is plotted for each time.

Figure 4:
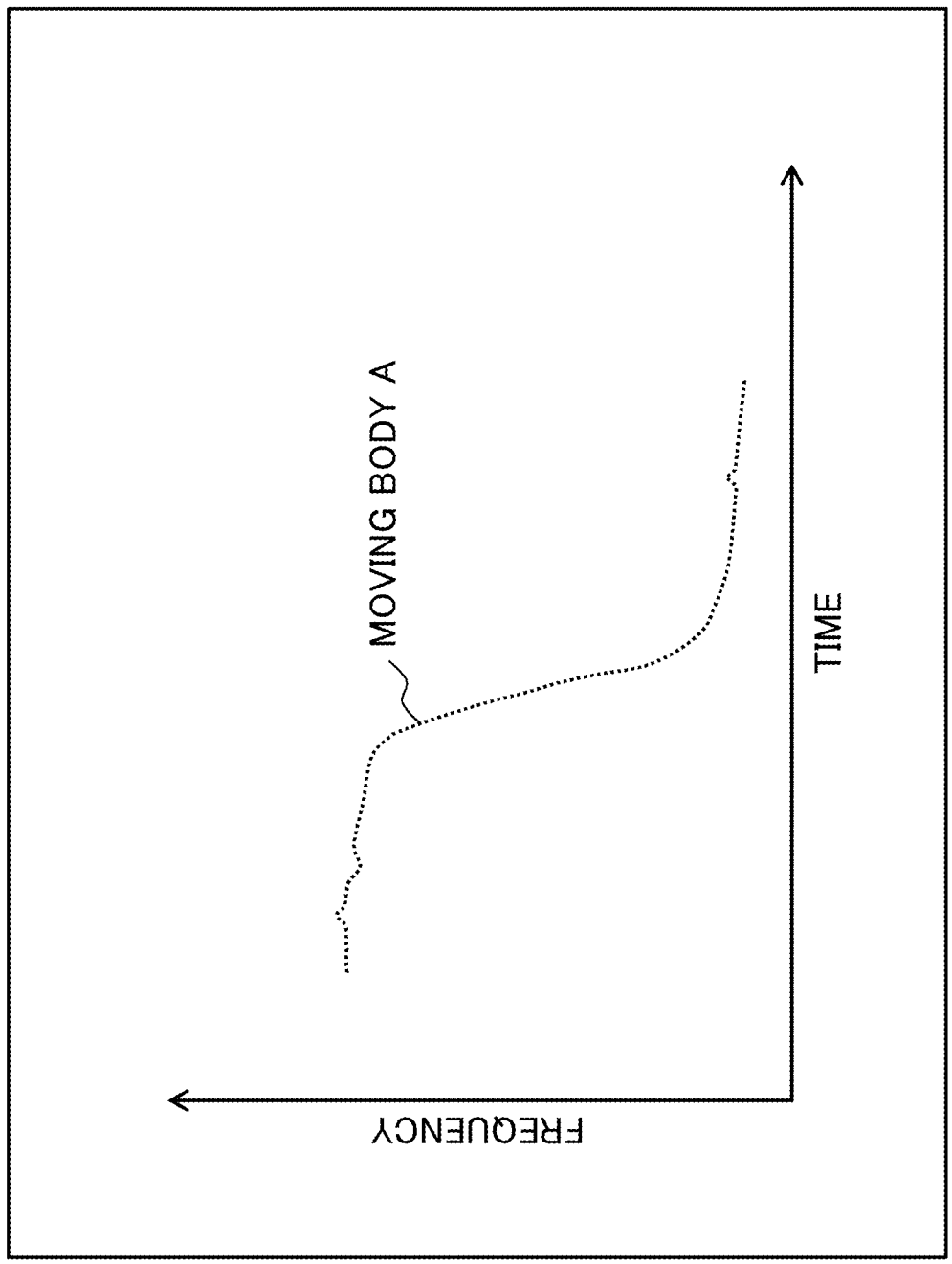
FIG. 4 is a conceptual diagram for explaining a peak waveform generated by the trajectory estimation device according to the first example embodiment.

FIG. 4 is a graph illustrating an example of a peak waveform extracted by the waveform generation unit 13. The peak waveform in FIG. 4 is based on the wave detected by any one of the sensors 100 selected by the signal selection unit 12 among the sensors 100. FIG. 4 is a peak waveform based on the wave from a moving body A.

Figure 5:
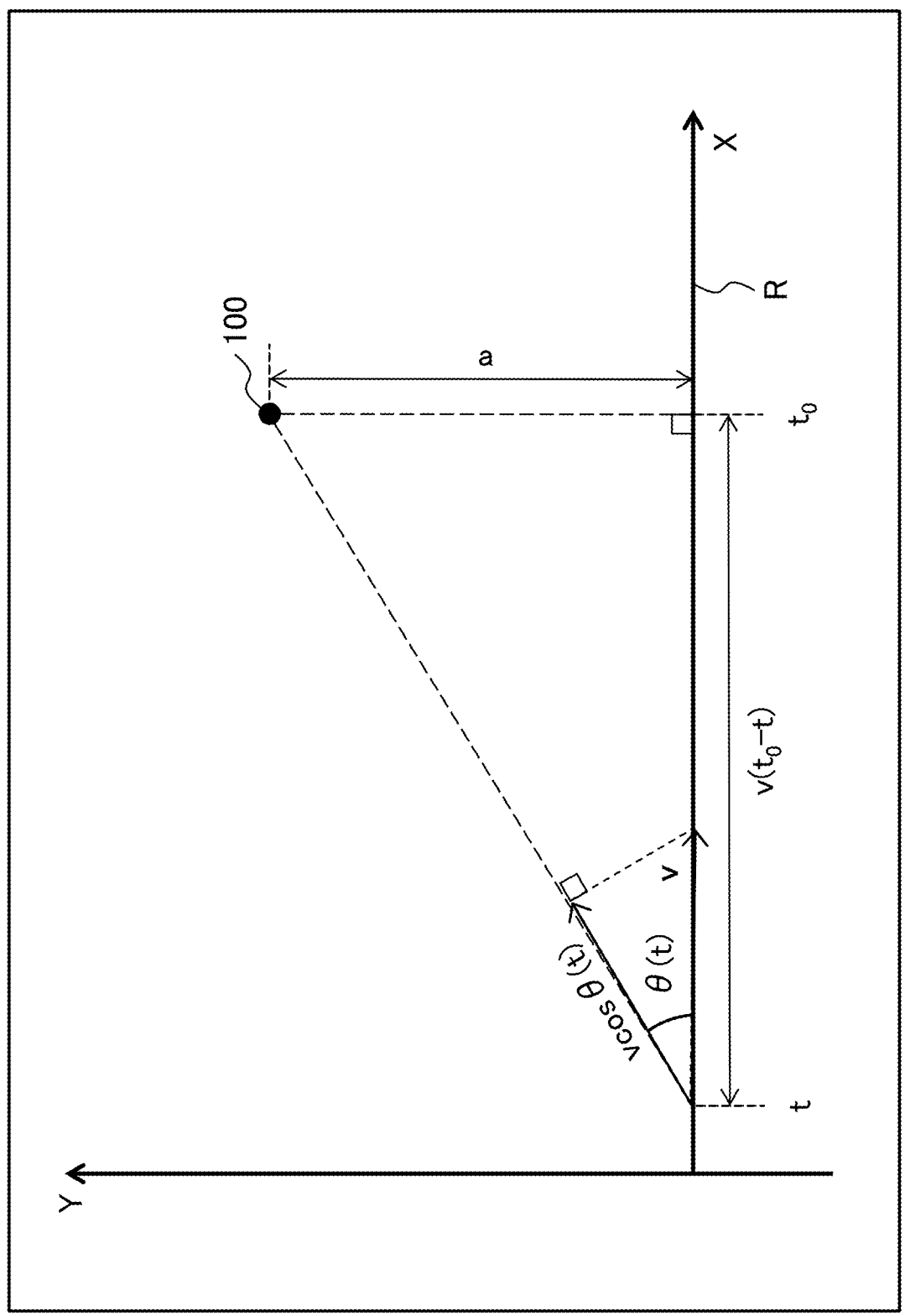
FIG. 5 is a conceptual diagram for explaining trajectory parameters estimated by the trajectory estimation device according to the first example embodiment.

The parameter estimation unit 14 fits the extracted peak waveform to the theoretical formula f of the Doppler shift and estimates a parameter (also referred to as a trajectory parameter) regarding the trajectory of the moving body for each of the selected sensors 100. The parameter estimation unit 14 estimates the trajectory parameters such as the velocity v of the moving body having the wave source, the wave frequency $f_0$ generated by the wave source, the shortest distance a between the moving body and the sensor 100, and the time to at which the moving body approaches the sensor 100-most. FIG. 5 is a conceptual diagram for explaining trajectory parameters estimated by the parameter estimation unit 14. It is assumed that the moving body makes a uniform linear motion at the velocity v along the trajectory R in the verification frame. θ(t) is an angle (also referred to as a wave source direction) formed by a straight line connecting the moving body and the sensor 100 and the trajectory R of the moving body having the wave source at time t. The parameter estimation unit 14 estimates a trajectory parameter by fitting the theoretical formula f of the Doppler shift of the following Expression 1 to the peak waveform.

$$f = \frac{c}{c - v\cos\theta(t)} f_0 = \frac{c}{c - \frac{v^2(t_0 - t)}{\sqrt{a^2 + v^2(t_0 - t)^2}}} f_0 \quad (1)$$

However, in the above Expression 1, c is the speed of the wave in the observation environment.

Using the trajectory parameters estimated by the parameter estimation unit 14, the trajectory estimation unit 17 estimates a candidate (hereinafter, also referred to as a wave source direction candidate) of a wave source direction for all pairs of peak waveforms from among peak waveforms measured by the three sensors 100. The trajectory estimation unit 17 estimates a candidate of trajectory (hereinafter, it is also referred to as a trajectory candidate) of the moving body using the estimated wave source direction candidate.

For example, the trajectory estimation unit 17 estimates the wave source direction candidates for all the pairs of peak waveforms using the trajectory parameters estimated for each peak waveform. The trajectory estimation unit 17 calculates a wave source direction candidate $\varphi_{mn}$ regarding the sensor 100-m and the sensor 100-n using the following Expression 2 (m and n are natural numbers).

$$\tan\square_{mn} = \frac{a_n - a_m}{v(t_n - t_m)} \quad (2)$$

In Equation 2, m represents the identification number of the sensor 100-m, and n represents the identification number of the sensor 100-n. $t_m$ indicates a time (also referred to as a start time) when the moving body comes closest to the sensor 100-m, and $a_m$ indicates a distance between the sensor 100-m and the moving body at the start time $t_m$. Similarly, $t_n$ indicates a time (also referred to as an end time) when the moving body comes closest to the sensor 100-n, and $a_n$ indicates a distance between the sensor 100-n and the moving body at the end time $t_n$. The shortest distance a between the moving body and the sensor 100 and the wave source direction candidate $\varphi_{mn}$ have a clockwise direction positive with respect to a line segment connecting the two sensors 100. However, in the time from the start time $t_m$ to the end time $t_n$, it is assumed that the moving body makes a uniform linear motion.

The trajectory estimation unit 17 estimates four wave source direction candidates for each of the pairs of peak waveforms according to the positional relationship between the two sensors 100 and the trajectory. The trajectory estimation unit 17 estimates four trajectory candidates for each of the estimated four wave source direction candidates. FIGS. 6 to 9 are conceptual diagrams for explaining the wave source direction candidates and the trajectory candidates estimated by the trajectory estimation unit 17. In the examples of FIGS. 6 to 9, the moving body moves rightward at a positive velocity v.

Figure 6:
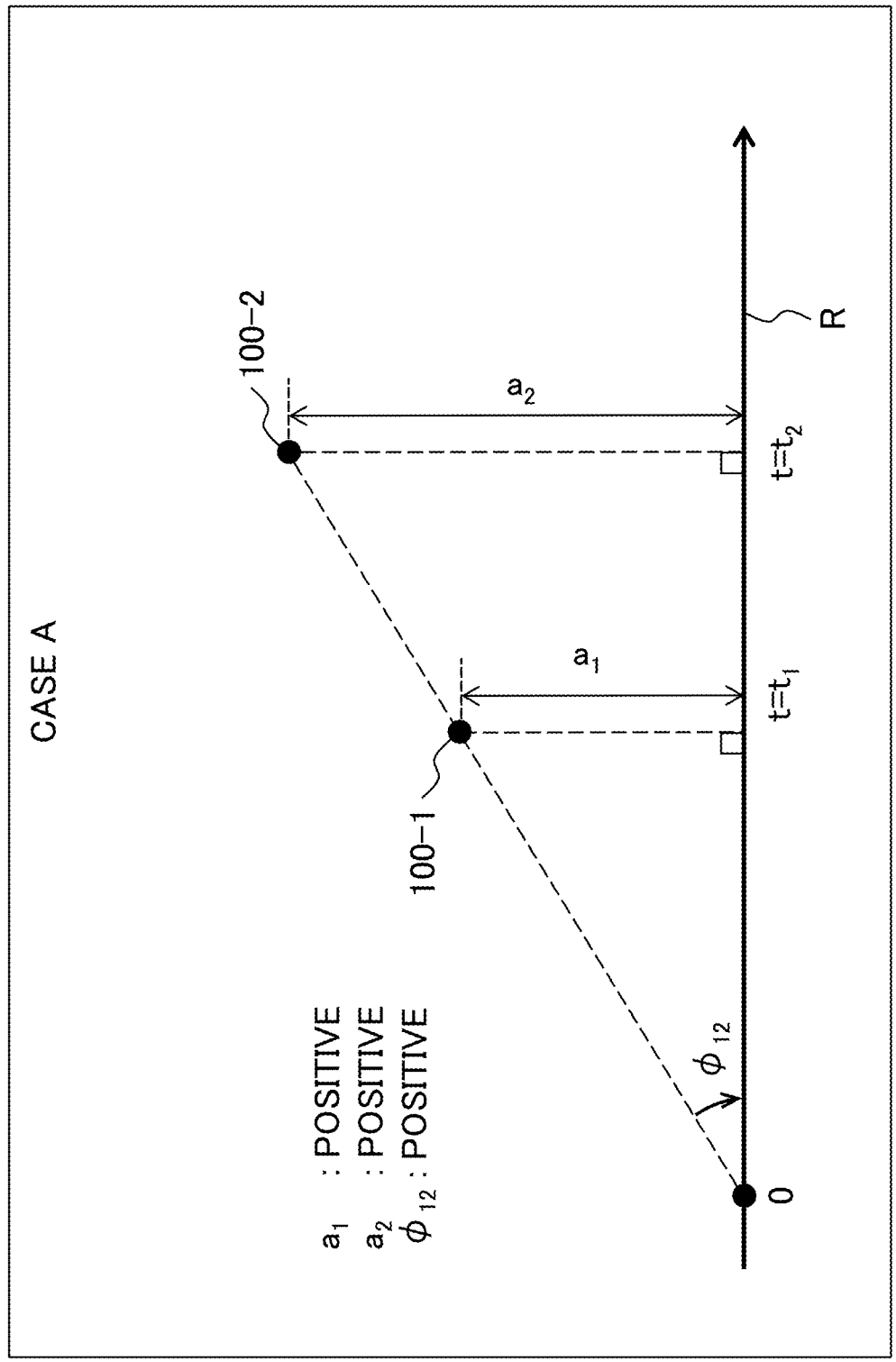
FIG. 6 is a conceptual diagram for explaining a positional relationship between a wave source direction candidate estimated by the trajectory estimation device according to the first example embodiment and a sensor.

FIG. 6 illustrates an example (case A) in which both the sensor 100-1 and the sensor 100-2 are located on the upper side with respect to the trajectory R of the moving body. In the case A, the distance $a_1$ between the sensor 100-1 and the moving body at time $t_1$ when the moving body comes closest to the sensor 100-1 is positive, and the distance $a_2$ between the sensor 100-2 and the moving body at time $t_2$ when the moving body comes closest to the sensor 100-2 is positive. In the case A, the wave source direction candidate $\varphi_{12}$ is positive.

Figure 7:
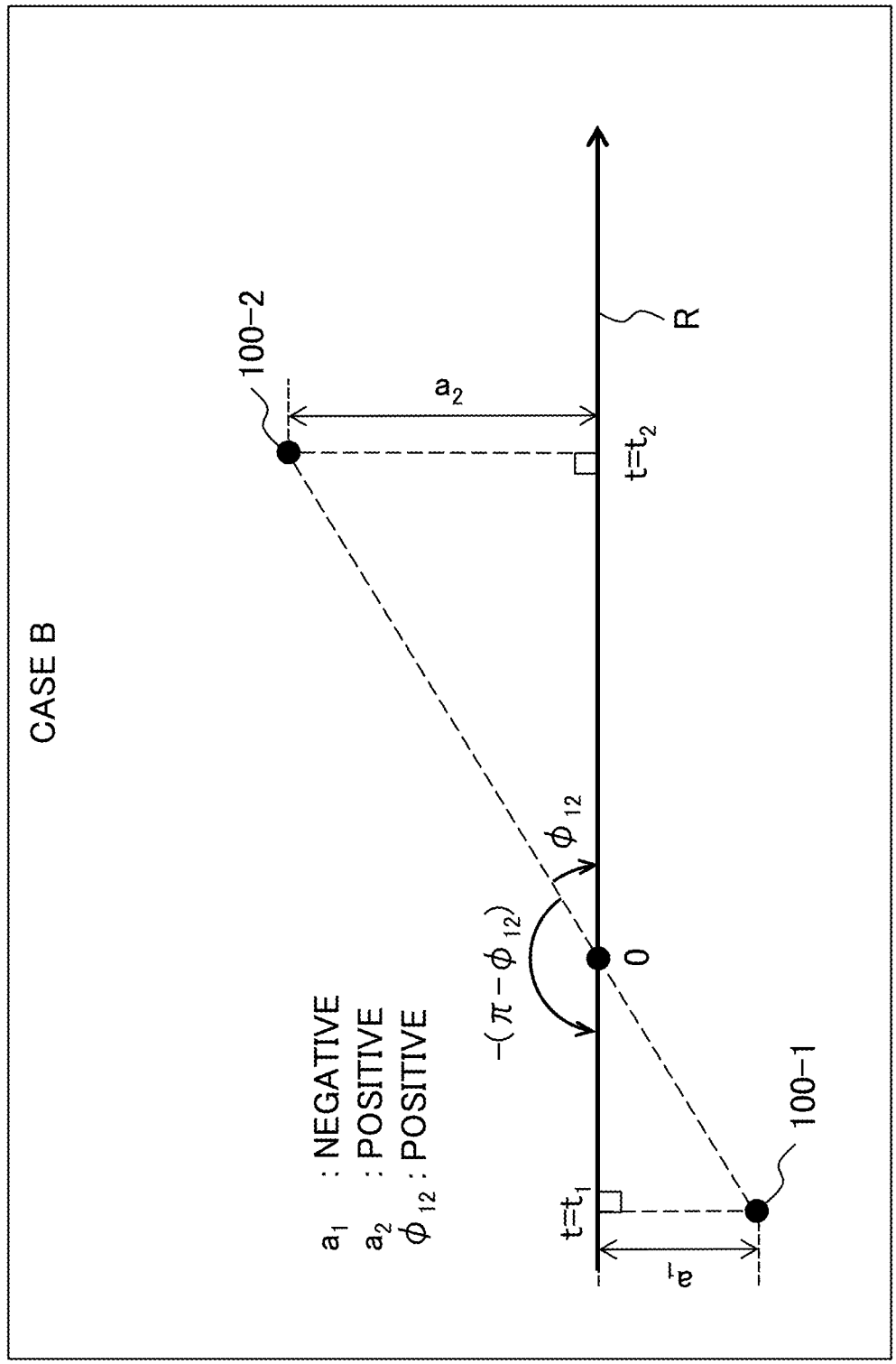
FIG. 7 is a conceptual diagram for explaining a positional relationship between a wave source direction candidate estimated by the trajectory estimation device according to the first example embodiment and a sensor.

FIG. 7 illustrates an example (case B) in which the sensor 100-1 is located on the lower side and the sensor 100-2 is located on the upper side with respect to the trajectory R of the moving body. In the case B, the distance $a_1$ between the sensor 100-1 and the moving body at time $t_1$ when the moving body comes closest to the sensor 100-1 is negative, and the distance $a_2$ between the sensor 100-2 and the moving body at time $t_2$ when the moving body comes closest to the sensor 100-2 is positive. In the case B, the wave source direction candidate $\varphi_{12}$ is positive.

Figure 8:
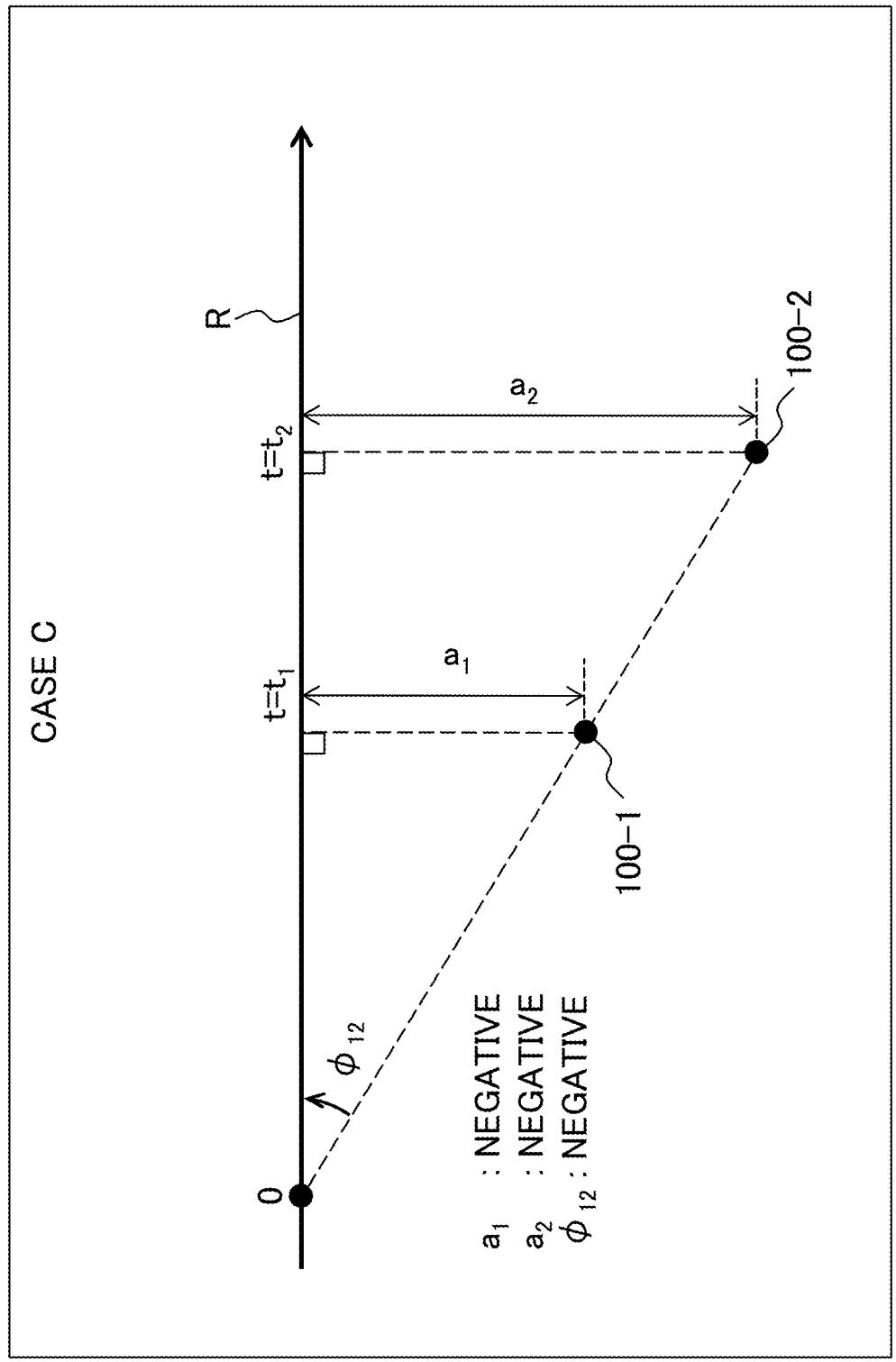
FIG. 8 is a conceptual diagram for explaining a positional relationship between a wave source direction candidate estimated by the trajectory estimation device according to the first example embodiment and a sensor.

FIG. 8 illustrates an example (case C) in which both the sensor 100-1 and the sensor 100-2 are located on the lower side with respect to the trajectory R of the moving body. In the case C, the distance $a_1$ between the sensor 100-1 and the moving body at time $t_1$ when the moving body comes closest to the sensor 100-1 is negative, and the distance $a_2$ between the sensor 100-2 and the moving body at time $t_2$ when the moving body comes closest to the sensor 100-2 is negative. In the case C, the wave source direction candidate $\varphi_{12}$ is negative.

Figure 9:
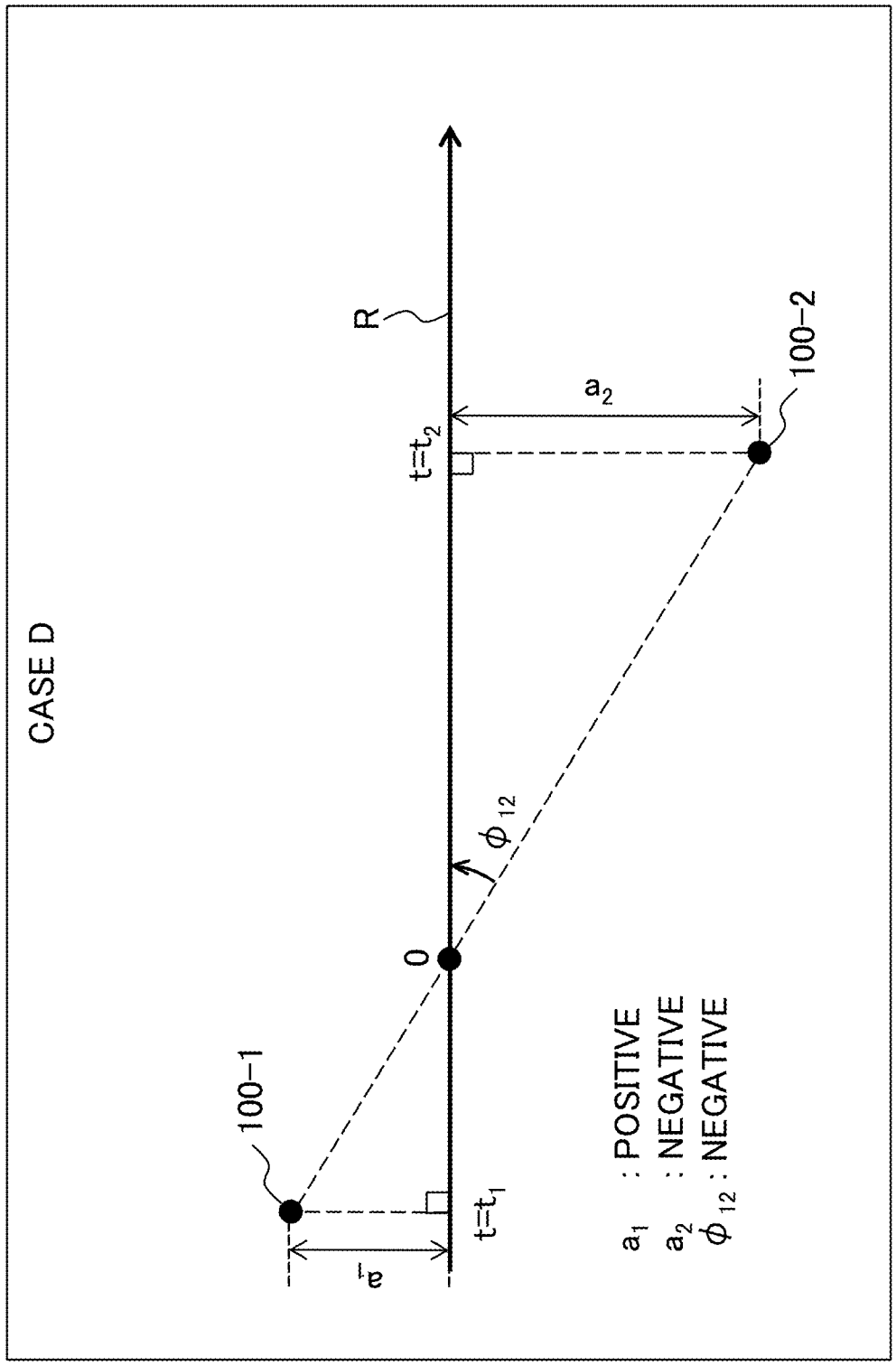
FIG. 9 is a conceptual diagram for explaining a positional relationship between a wave source direction candidate estimated by the trajectory estimation device according to the first example embodiment and a sensor.

FIG. 9 illustrates an example (case D) in which the sensor 100-1 is located on the upper side and the sensor 100-2 is located on the lower side with respect to the trajectory R of the moving body. In the case D, the distance $a_1$ between the sensor 100-1 and the moving body at time $t_1$ when the moving body comes closest to the sensor 100-1 is positive, and the distance $a_2$ between the sensor 100-2 and the moving body at time $t_2$ when the moving body comes closest to the sensor 100-2 is negative. In the case D, the wave source direction candidate $\varphi_{12}$ is negative.

Figure 10:
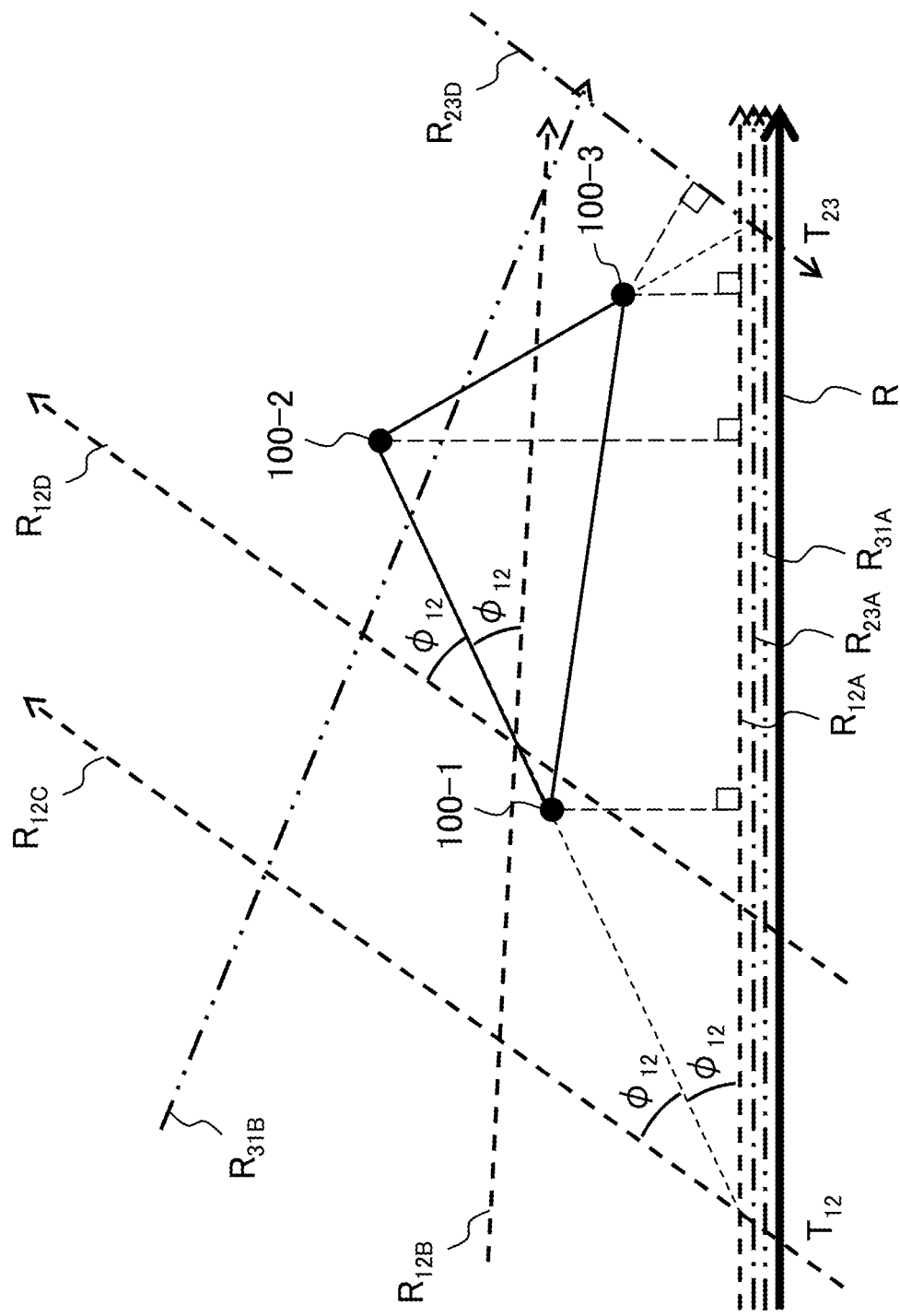
FIG. 10 is a conceptual diagram for explaining a trajectory estimated by the trajectory estimation device according to the first example embodiment.

FIG. 10 is a conceptual diagram summarizing trajectory candidates based on the wave source direction candidates estimated for all combinations of the sensors 100-1 to 3 calculated by the trajectory estimation unit 17. In FIG. 10, all trajectory candidates are illustrated for combinations of the sensor 100-1 and the sensor 100-2, but some trajectory candidates are omitted for other combinations (sensor 100-2 and sensor 100-3, sensor 100-3 and sensor 100-1).

The trajectory estimation unit 17 estimates four trajectory candidates for a combination of the sensor 100-1 and the sensor 100-2. In FIG. 10, regarding the combination of the sensor 100-1 and the sensor 100-2, the trajectory candidates in the case A, the case B, the case C, and the case D are referred to as a trajectory candidate $R_{12A}$, a trajectory candidate $R_{12B}$, a trajectory candidate $R_{12C}$, and a trajectory candidate $R_{12D}$, respectively. Similarly, with respect to the combination of other sensors 100, the sign of the trajectory candidate is written according to the case.

In the example of FIG. 10, the trajectory estimation unit 17 estimates three overlapping trajectory candidates for all combinations of the sensors 100-1 to 3. Three trajectory candidates overlapping for all combinations of the sensors 100-1 to 3 are a trajectory candidate $R_{12A}$, a trajectory candidate $R_{23A}$, and a trajectory candidate $R_{31A}$. The trajectory estimation unit 17 estimates three trajectory candidates overlapping for all combinations of the sensors 100-1 to 3 as the trajectory R of the moving body. The three overlapping trajectory candidates do not always completely match. In such a case, the trajectory estimation unit 17 may select the closest three trajectory candidates among the plurality of estimated trajectory candidates and estimate the trajectory R. For example, the trajectory estimation unit 17 estimates the trajectory R by selecting one of the three selected trajectory candidates or averaging the three selected trajectory candidates. In the trajectory R estimated in this way, a direction viewed from the sensor 100-$n$ and the sensor 100-$m$ is $\varphi_{Rnm}$. For example, the trajectory estimation unit 17 estimates the velocity $v_R$ in the trajectory R as an average value, an intermediate value, or the like of the velocities $v_1$, $v_2$, and $v_3$ estimated for all combinations of the sensors 100-1 to 3.

Figure 11:
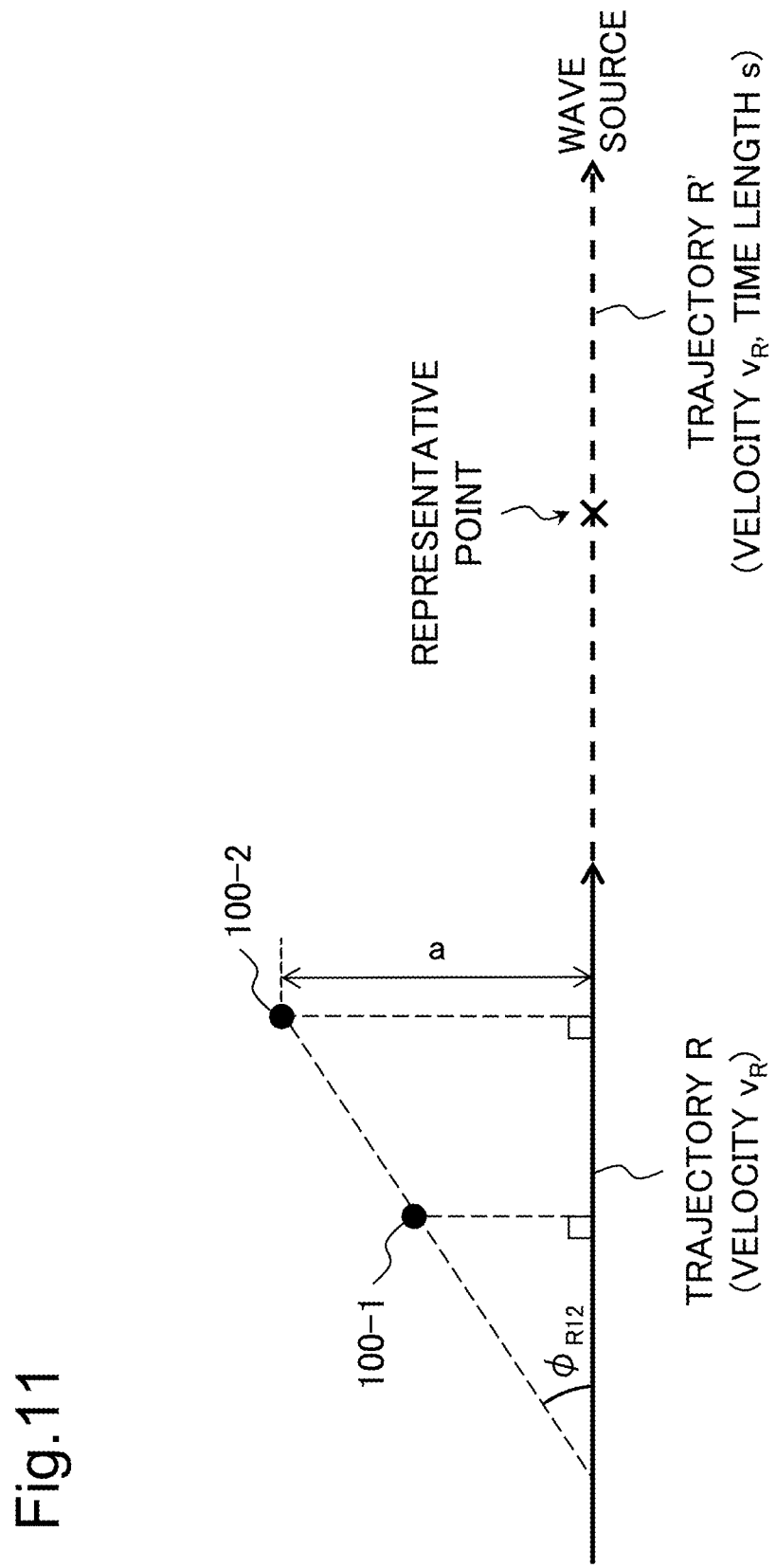
FIG. 11 is a conceptual diagram for explaining an example of estimating a position of a moving body in a next verification frame based on a trajectory estimated by the trajectory estimation device.

The trajectory R estimated by the trajectory estimation unit 17 is used to estimate the position of the moving body in the next verification frame. FIG. 11 is a conceptual diagram for explaining an example of estimating the position of the moving body in the next verification frame based on the trajectory R estimated by the trajectory estimation unit 17. For example, as illustrated in FIG. 11, it is assumed that the trajectory R in the current verification frame draws an extended trajectory R' without changing the direction even in the next verification frame. At this time, the position of the representative point in the trajectory R' is estimated as the position of the moving body in the next verification frame. For example, the position of the representative point is set as a midpoint of the trajectory R'. The velocity of the moving body estimated in the current verification frame is $v_R$, and half of the length (time length s) of the next verification frame is s/2. In this case, the position of the moving body in the next verification frame is estimated as a position separated from the end position of the current verification frame by $s|v_R|/2$ in the direction $\varphi_{R12}$.

For example, when verifying the next verification frame, the signal selection unit 12 may select a signal detected by the sensor 100 close to the position of the moving body estimated by such a method.

For example, the trajectory R of the moving body estimated by the trajectory estimation unit 17 is displayed on a screen of a display device (not illustrated). For example, the trajectory R of the moving body estimated by the trajectory estimation unit 17 may be output to an arbitrary system that performs processing based on the estimated trajectory, or may be accumulated in a database.

Figure 12:
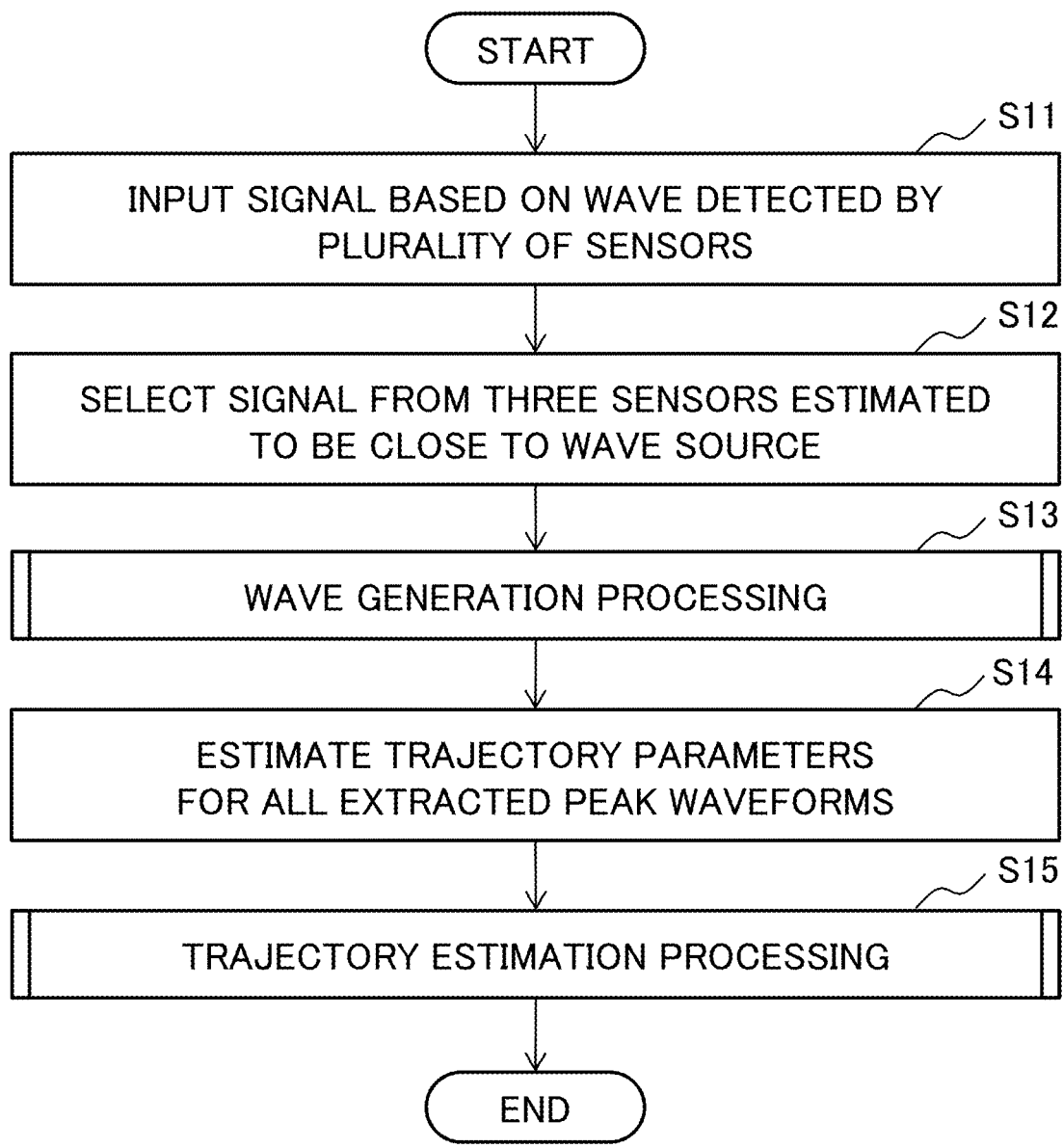
FIG. 12 is a conceptual diagram illustrating an example in which a trajectory estimated by the trajectory estimation device according to the first example embodiment is displayed on a screen of a display device.

FIG. 12 is a conceptual diagram illustrating an example in which the trajectory R of the moving body 110 estimated by the trajectory estimation device 10 is displayed on the screen of a display device 120. FIG. 12 illustrates an example in which the moving body 110 such as an automobile or a bicycle moves on a road of a district where a plurality of sensors 100 are arranged. For example, the trajectory R of the moving body 110 is displayed on a map including a route on which the moving body 110 moves. For example, the trajectory R of the moving body 110 is displayed on a map including the course of the moving body 110 according to the type of the moving body 110 such as an automobile, a ship, or a submarine. For example, the moving body 110 is an ambulance that travels while emitting a siren, a ship that navigates while sounding a horn, a bicycle that travels while sounding a buzzer, or the like. A motorcycle or an automobile that travels while emitting an exhaust sound at a constant frequency can also be a target of the moving body 110.

(Operation)

Figure 13:
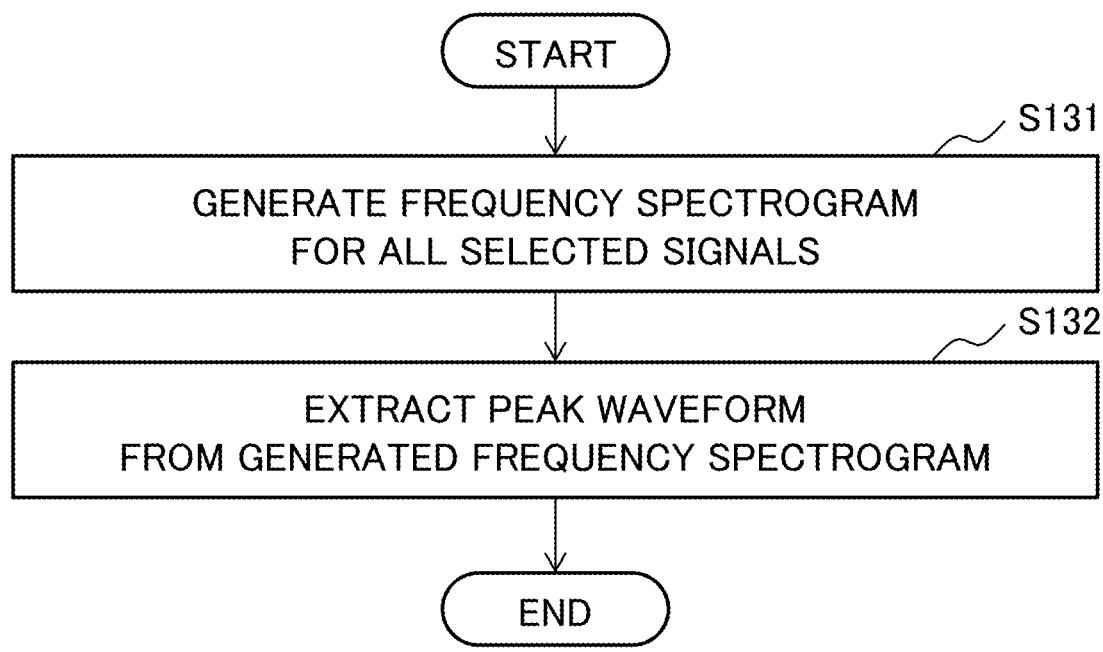
FIG. 13 is a flowchart for explaining an example of an outline of an operation of the trajectory estimation device according to the first example embodiment.

Next, an operation of the trajectory estimation device 10 of the present example embodiment will be described with reference to the drawings. FIG. 13 is a flowchart for explaining an outline of the operation of the trajectory estimation device 10. FIG. 13 relates to an operation for one frame. The processing along the flowchart of FIG. 13 will be described with the trajectory estimation device 10 as the main operation.

In FIG. 13, first, the trajectory estimation device 10 acquires a signal based on the waves detected by the plurality of sensors 100 (step S11).

Next, the trajectory estimation device 10 selects signals from at least three sensors estimated to be close to the moving body (step S12).

Next, the trajectory estimation device 10 generates peak waveforms regarding all the selected signals by waveform generation processing (step S13). Details of the waveform generation processing will be described later.

Next, the trajectory estimation device 10 fits all the extracted peak waveforms to the theoretical formula of the Doppler shift to estimate the trajectory parameters (step S14).

Next, the trajectory estimation device 10 estimates a trajectory of the moving body by trajectory estimation processing using the extracted frequency components (step S15). Details of the trajectory estimation processing will be described later.

When the process is continued after step S15, the process returns to step S11. When the process is stopped after step S15, the process according to the flowchart of FIG. 13 is ended. The process may be stopped at a timing when trajectory estimation is performed a scheduled number of times, a scheduled processing time elapses, or the process is stopped according to a user operation.

[Waveform Generation Processing]

Figure 14:
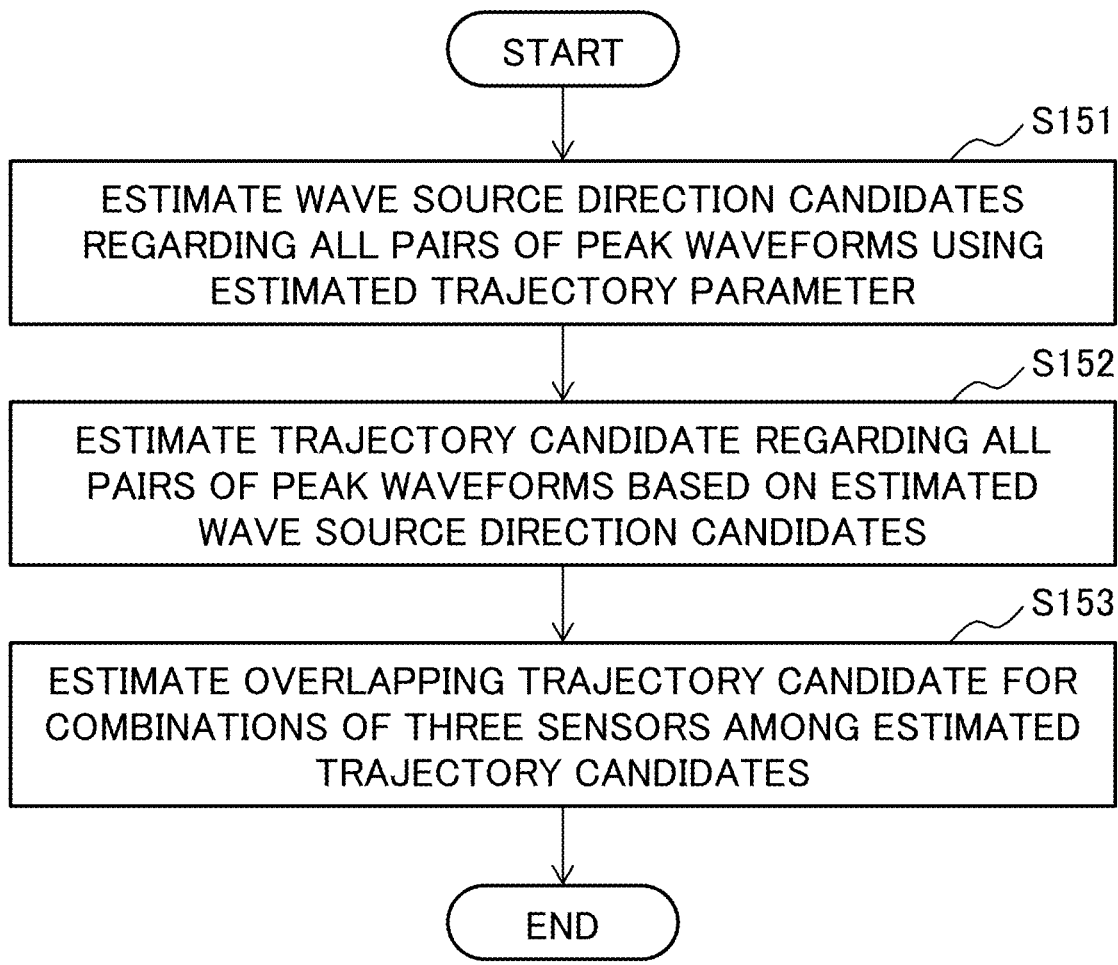
FIG. 14 is a flowchart for explaining an example of waveform generation processing by the trajectory estimation device according to the first example embodiment.

Next, waveform generation processing (step S13 in FIG. 13) by the trajectory estimation device 10 will be described with reference to the drawings. FIG. 14 is a flowchart for explaining the waveform generation processing. The processing along the flowchart of FIG. 14 will be described with the components (waveform generation unit 13) of the trajectory estimation device 10 as the main operation.

In FIG. 14, first, the waveform generation unit 13 generates a frequency spectrogram for all the selected signals (step S131).

Next, the waveform generation unit 13 extracts a peak waveform from the generated frequency spectrogram (step S132).

[Trajectory Estimation Processing]

Figure 15:
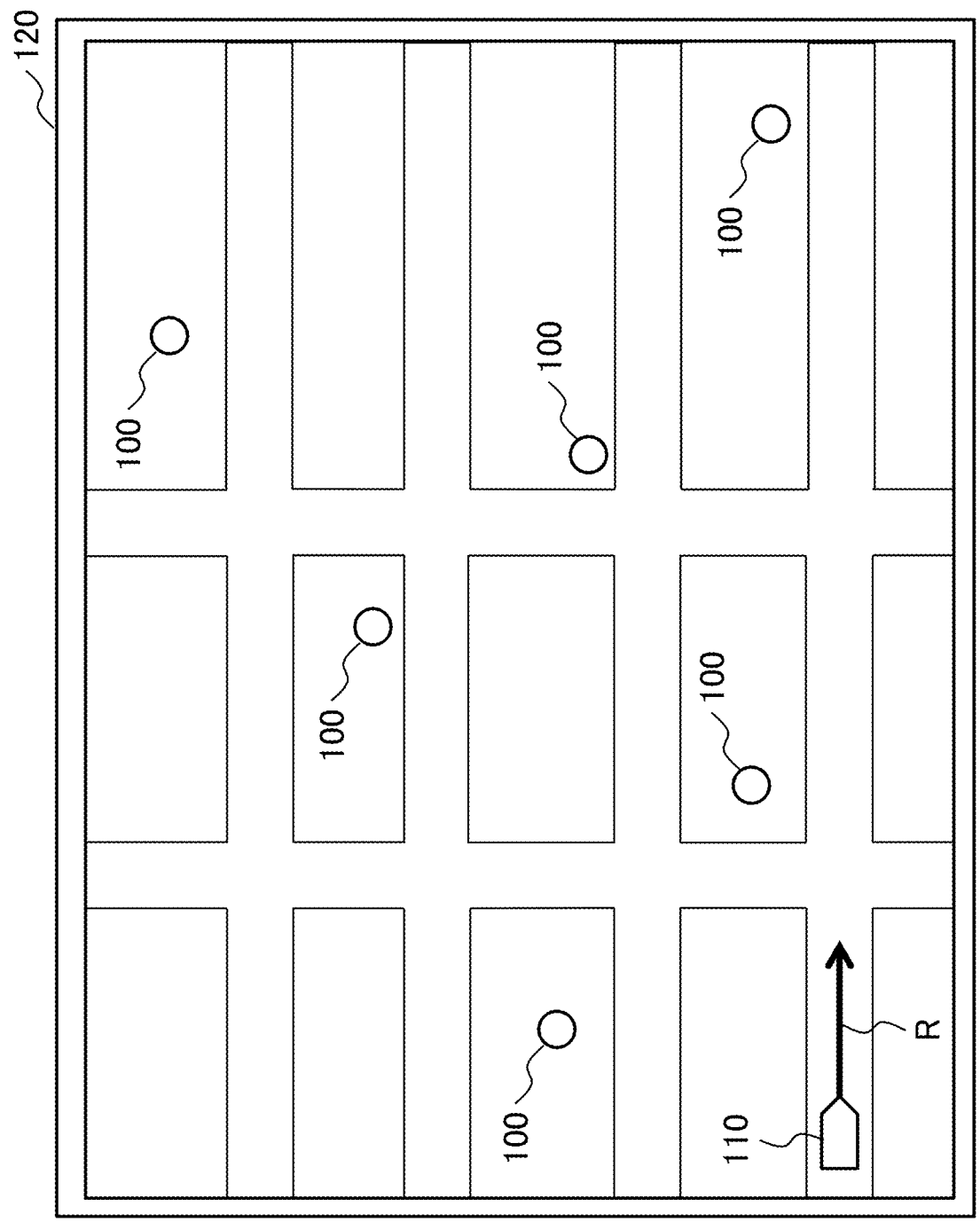
FIG. 15 is a flowchart for explaining an example of trajectory estimation processing by the trajectory estimation device according to the first example embodiment.

Next, trajectory estimation processing (step S15 in FIG. 13) by the trajectory estimation device 10 will be described with reference to the drawings. FIG. 15 is a flowchart for explaining the trajectory estimation processing. The processing along the flowchart of FIG. 15 will be described with the components (trajectory estimation unit 17) of the trajectory estimation device 10 as the main operation.

In FIG. 15, first, the trajectory estimation unit 17 estimates wave source direction candidates regarding all pairs of peak waveforms using the estimated trajectory parameters (step S151).

Next, the trajectory estimation unit 17 estimates trajectory candidates regarding all pairs of peak waveforms based on the estimated wave source direction candidates (step S152).

Next, the trajectory estimation unit 17 estimates an overlapping trajectory candidate as a trajectory of the moving body for a combination of three sensors among the estimated trajectory candidates (step S153). For example, the trajectory of the moving body estimated by the trajectory estimation unit 17 is displayed on a screen of a display device (not illustrated). For example, the trajectory of the moving body estimated by the trajectory estimation unit 17 may be output to an arbitrary system that performs processing based on the estimated trajectory, or may be accumulated in a database.

As described above, the trajectory estimation device of the present example embodiment includes the signal input unit, the signal selection unit, the waveform generation unit, the parameter estimation unit, and the trajectory estimation unit. The signal input unit inputs signals based on the waves detected by the plurality of sensors. The signal selection unit selects signals from at least three sensors estimated to be close to the wave source from among the plurality of sensors. The waveform generation unit generates a peak waveform that is time series data of peak frequencies of signals by using signals based on waves detected by at least three sensors. For example, the waveform generation unit generates a frequency spectrogram using a signal based on the wave detected by the sensor, and generates time series data of peak frequencies extracted from the generated frequency spectrogram as a peak waveform. The parameter estimation unit estimates a trajectory parameter relating to a trajectory of a moving body having a wave source of a wave from peak waveforms relating to the waves detected by at least three sensors. The trajectory estimation unit estimates a wave source direction candidate for each wave using the trajectory parameter for all combinations of two peak waveforms selected from among combinations of at least three peak waveforms. The trajectory estimation unit estimates, as a trajectory of the moving body, trajectory candidates overlapping each other among trajectory candidates estimated based on the wave source direction candidates.

According to the trajectory estimation device of the present example embodiment, it is possible to estimate the trajectory of the moving body having the wave source by estimating, as the trajectory of the moving body, trajectory candidates overlapping each other among trajectory candidates estimated based on the waves detected by at least three sensors.

In one aspect of the present example embodiment, the parameter estimation unit fits the theoretical formula of the Doppler shift to the peak waveform to estimate the trajectory parameter including the velocity of the moving body, the wave frequency generated by the wave, the shortest distance between the trajectory of the moving body and the sensor, and the time when the moving body approaches the sensor the most. According to the present aspect, the trajectory parameter can be estimated by fitting the peak waveform to the theoretical formula of the Doppler shift.

In one aspect of the present example embodiment, the signal selection unit estimates the position of the moving body in the current verification frame based on the position of the moving body estimated in the previous frame. The signal selection unit selects a signal based on the waves detected by at least three sensors close to the estimated position of the moving body. The waveform generation unit generates a peak waveform that is time series data of peak frequencies of signals by using signals based on waves detected by at least three selected sensors. According to the present aspect, it is possible to select a sensor suitable for estimating the position of the wave source in the current verification frame based on the position of the wave source estimated in the previous frame.

Second Example Embodiment

Next, a trajectory estimation device according to a second example embodiment will be described with reference to the drawings. The trajectory estimation device of the present example embodiment is different from that of the first example embodiment in that a trajectory of a moving body is estimated based on waves in a plurality of frequency bands emitted by a plurality of wave sources. In the present example embodiment, it is assumed that each of a plurality of moving bodies has a plurality of wave sources, and each wave source has one peak. In particular, in the present example embodiment, an example of estimating a trajectory of a moving body having a plurality of wave sources that emit a wave of a single frequency will be mainly described. In the present example embodiment, regarding the same moving body, it is assumed that the Doppler shift amount is the same for all wave sources.

Figure 16:
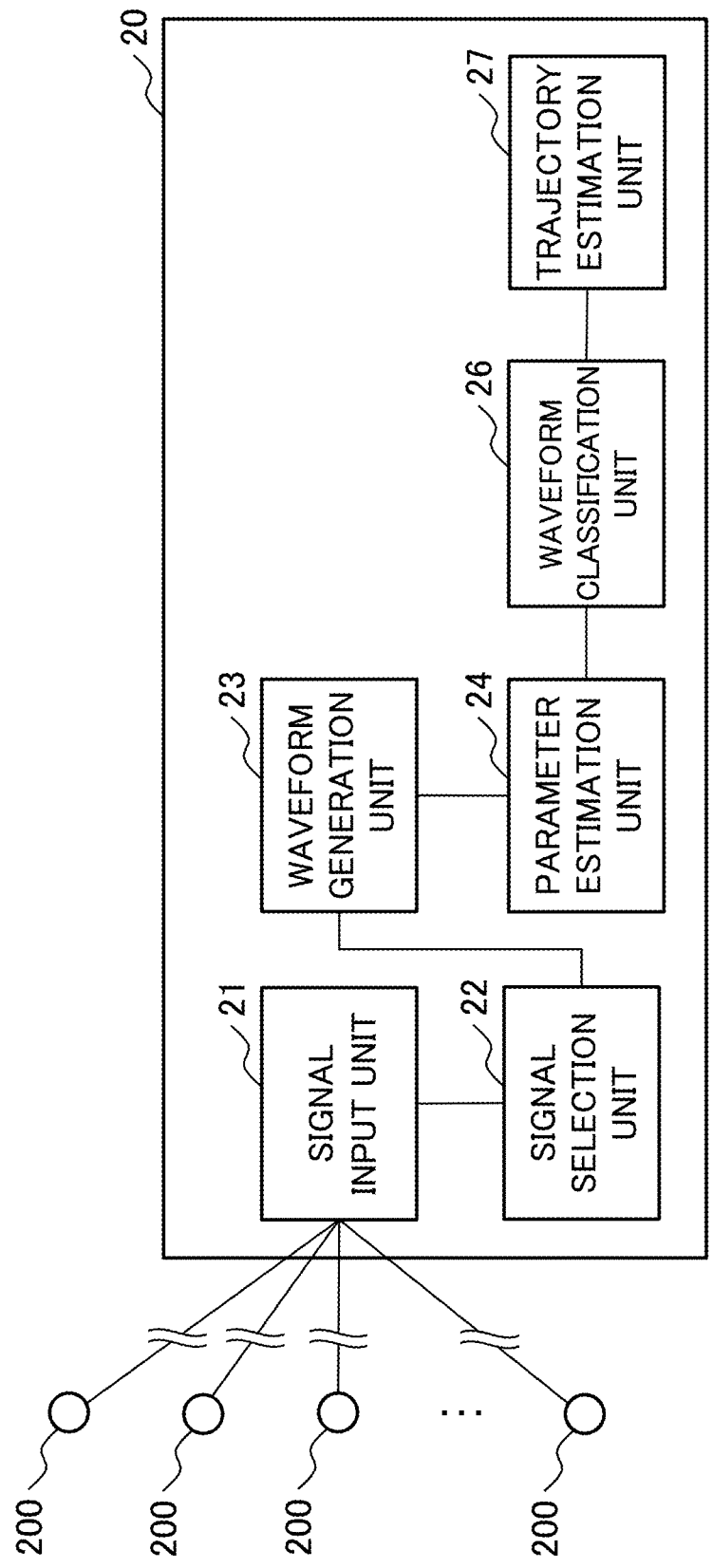
FIG. 16 is a block diagram illustrating an example of a configuration of a trajectory estimation device according to a second example embodiment.

FIG. 16 is a block diagram illustrating an example of a configuration of a trajectory estimation device 20 according to the present example embodiment. The trajectory estimation device 20 includes a signal input unit 21, a signal selection unit 22, a waveform generation unit 23, a parameter estimation unit 24, a waveform classification unit 26, and a trajectory estimation unit 27. The signal input unit 21, the signal selection unit 22, the waveform generation unit 23, the parameter estimation unit 24, and the trajectory estimation unit 27 have functions similar to the relevant configurations of the first example embodiment. In the following description, points similar to those of the first example embodiment will be simplified, and points different from those of the first example embodiment will be focused.

The signal input unit 21 acquires a signal based on the waves detected by a plurality of sensors 200. The signal input unit 21 acquires the position of the sensor 200 capable of detecting the wave from the wave source. In a case where the position of the sensor 200 capable of detecting the wave from the wave source is registered in advance in the trajectory estimation device 20, the signal input unit 21 acquires the position of the sensor 200 registered in advance. In a case where the moving body includes a plurality of wave sources, the signal input unit 21 acquires a signal based on the wave from these wave sources. In a case where the moving body includes a single wave source, the signal input unit 21 acquires a signal based on the wave from the wave source. The signal input unit 21 outputs the acquired signal to the signal selection unit 22. The signal input unit 21 may be connected to the plurality of sensors 200 in a wired manner or in a wireless manner. For example, the signal input unit 21 may be connected to a plurality of sensors 200 via a network (not illustrated).

The signal selection unit 22 selects signals from the three sensors 200 estimated to be close to the moving body from among the plurality of sensors 200. The signal selection unit 22 may be omitted in a case where it is not necessary to select the sensor 200 for a reason such as a case where there are only three sensors 200 capable of detecting the wave generated from the wave source of the moving body or a case where the movement distance from the previous frame is sufficiently small.

The waveform generation unit 23 acquires at least three signals selected by the signal selection unit 22. The waveform generation unit 23 performs Fourier transform on the acquired signal to convert the signal into a frequency domain signal. The waveform generation unit 23 generates a frequency spectrogram using the frequency domain signal for each frame. The waveform generation unit 23 extracts a peak waveform from the generated frequency spectrogram.

Figure 17:
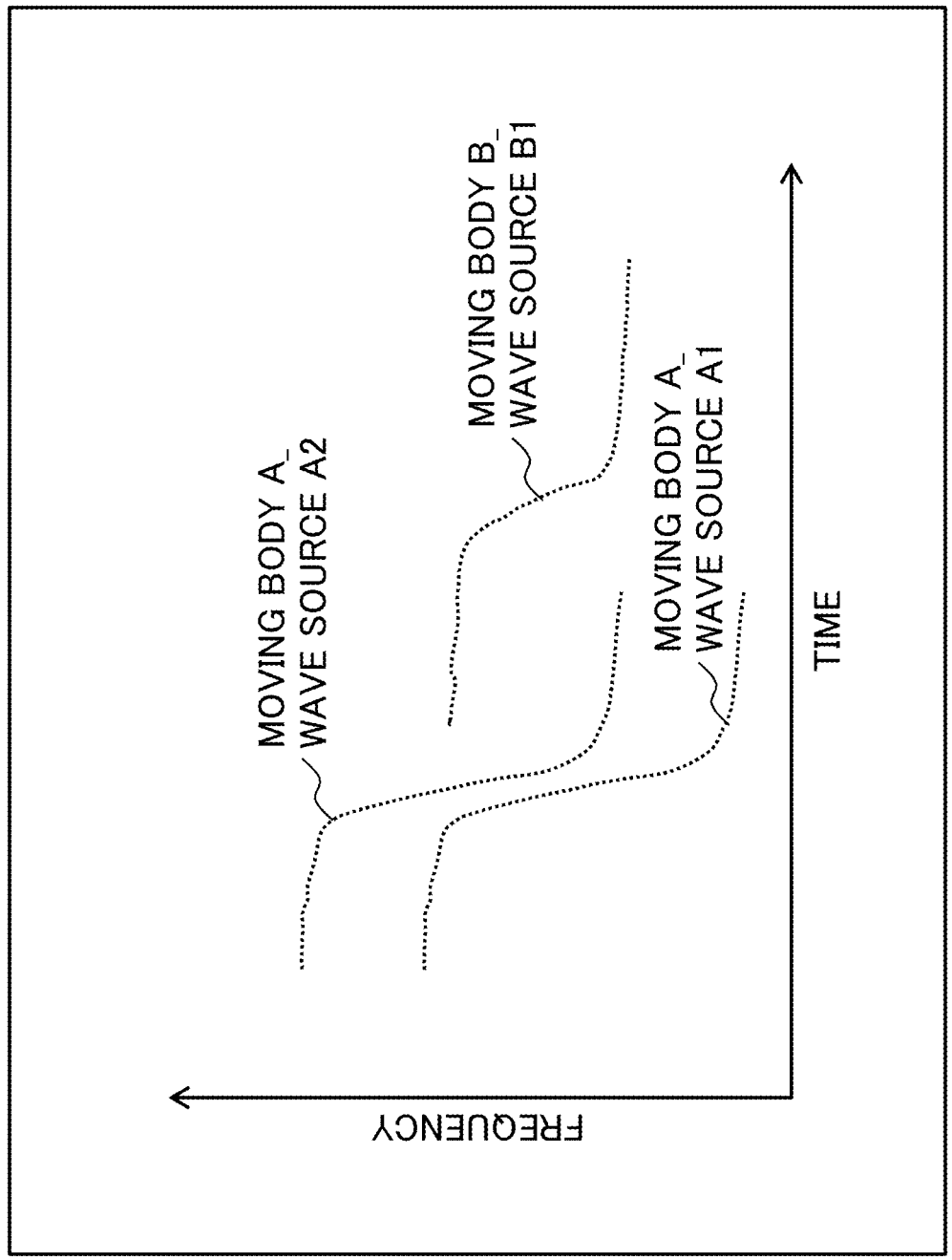
FIG. 17 is a conceptual diagram for explaining a peak waveform generated by the trajectory estimation device according to the second example embodiment.

FIG. 17 is a graph illustrating an example of a peak waveform extracted by the waveform generation unit 23. The peak waveform in FIG. 17 is based on the wave detected by any one of the sensors 200 selected by the signal selection unit 22 among the sensors 200. FIG. 17 illustrates a peak waveform based on the wave from a wave source A1 of the moving body A, a peak waveform based on the wave from a wave source A2 of the moving body A, and a peak waveform based on the wave from a wave source B1 of the moving body B.

The parameter estimation unit 24 estimates, by fitting all the extracted peak waveforms to the theoretical formula f of the Doppler shift, the trajectory parameters such as the velocity v of the moving body having the wave source, the wave frequency $f_0$ generated by the wave source, the shortest distance a between the moving body and the sensor 200, and the time to at which the moving body comes closest to the sensor 100.

Figure 18:
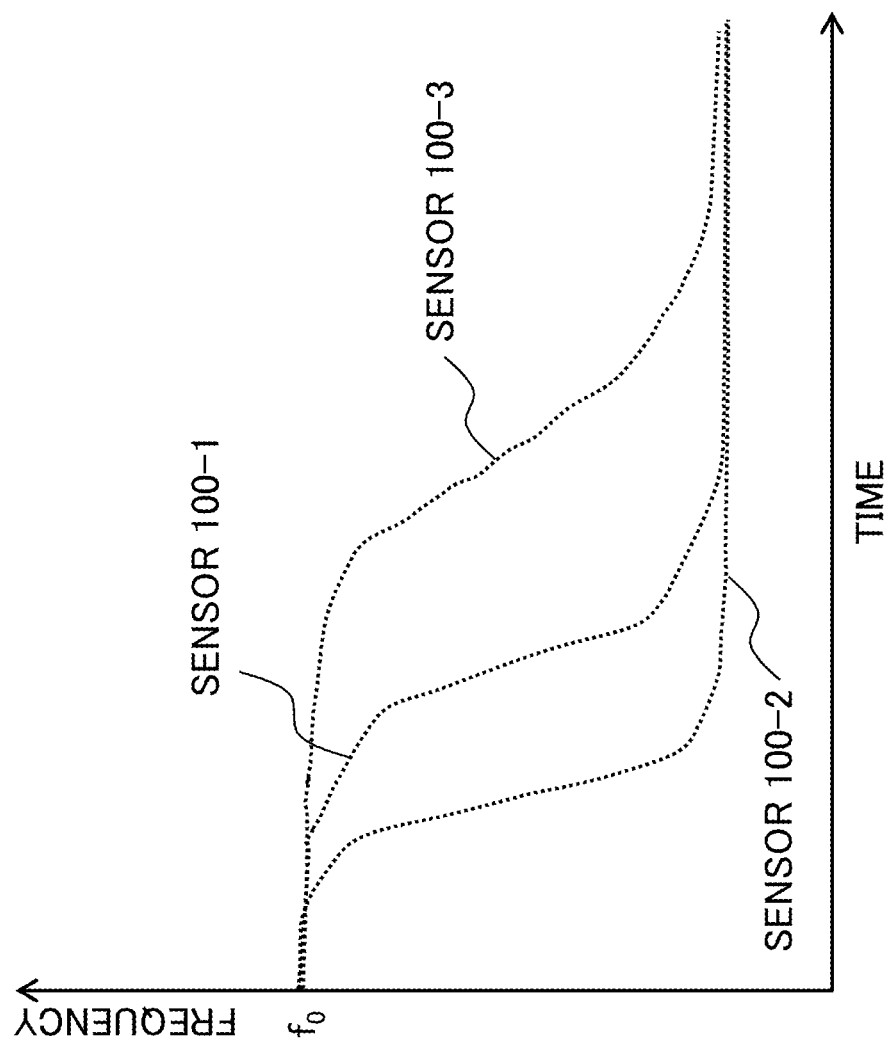
FIG. 18 is a conceptual diagram illustrating an example of peak waveforms clustered by the trajectory estimation device according to the second example embodiment.

In order to classify (cluster) waveforms of the same wave source of the same moving body from among the plurality of peak waveforms, the waveform classification unit 26 clusters, three by three, waveforms having a velocity v close to the estimated frequency $f_0$. The waveform classification unit 26 selects one peak waveform for each sensor from among a plurality of peak waveforms extracted from each sensor 200, and clusters a total of three peak waveforms for the sensors 200. FIG. 18 is a graph illustrating an example of peak waveforms clustered by the waveform classification unit 26. FIG. 18 illustrates an example in which peak waveforms having the same frequency $f_0$ and velocity v are clustered by the waveform classification unit 26. For example, the waveform classification unit 26 clusters, from among the plurality of peak waveforms, three peak waveforms having the same frequency $f_0$ and velocity v and having different shortest distances a between the sensor 200 and the moving body and different times to when the sensor 200 and the moving body are closest to each other. For example, the waveform classification unit 26 may cluster peak waveforms based on thresholds set in advance for the frequency $f_0$ and the velocity v. For example, the waveform classification unit 26 may cluster peak waveforms based on the relative closeness between the frequency $f_0$ and the velocity v. For example, the waveform classification unit 26 selects one peak waveform based on the wave detected by one of the three sensors 200 and one peak waveform having the closest frequency $f_0$ and velocity v from among the peak waveforms based on the waves detected by the other two sensors 200. When the three waveforms are not selected by the waveform classification unit 26, the signal input unit 21 performs the signal input again.

The trajectory estimation unit 27 estimates candidates for the wave source direction (hereinafter, also referred to as wave source direction candidates) for all combinations of two peak waveforms among the three peak waveforms clustered by the waveform classification unit 26. The trajectory estimation unit 27 estimates a candidate for a trajectory (hereinafter, it is also referred to as a trajectory candidate) of the moving body using the estimated wave source direction candidate. The trajectory estimation unit 27 estimates four wave source direction candidates in maximum for a combination of two peak waveforms according to the positional relationship between the two sensors 200 and the trajectory. The trajectory estimation unit 27 estimates three overlapping trajectory candidates as trajectories of the moving body for all sensor pairs (all combinations) among the three sensors 200. For example, the trajectory estimation unit 27 estimates three trajectory candidates overlapping with respect to all combinations of the three sensors 200 as the trajectory R of the moving body.

(Operation)

Figure 19:
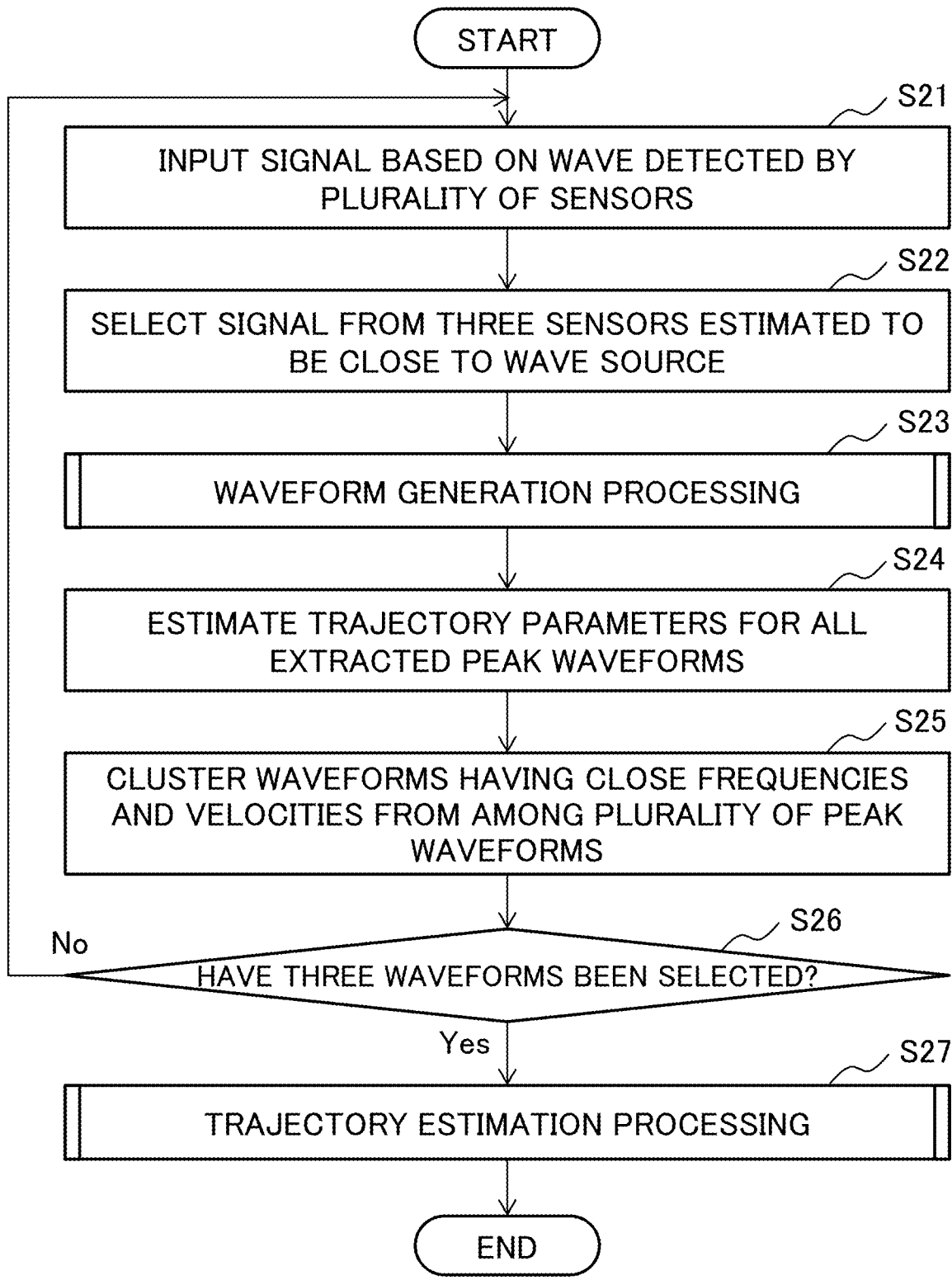
FIG. 19 is a flowchart for explaining a schematic example of the operation of the trajectory estimation device according to the second example embodiment.

Next, an operation of the trajectory estimation device 20 of the present example embodiment will be described with reference to the drawings. FIG. 19 is a flowchart for explaining the operation of the trajectory estimation device 20. FIG. 19 relates to an operation for one frame. The processing along the flowchart of FIG. 19 will be described with the trajectory estimation device 20 as the main operation.

In FIG. 19, first, the trajectory estimation device 20 acquires a signal based on the waves detected by the plurality of sensors 200 (step S21).

Next, the trajectory estimation device 20 selects signals from at least three sensors estimated to be close to the moving body (step S22).

Next, the trajectory estimation device 20 generates peak waveforms regarding all the selected signals by waveform generation processing (step S23). Since the waveform generation processing by the trajectory estimation device 20 is similar to that of the first example embodiment (FIG. 14), detailed description thereof will be omitted.

Next, the trajectory estimation device 20 fits all the extracted peak waveforms to the theoretical formula of the Doppler shift to estimate the trajectory parameters (step S24).

Next, the trajectory estimation device 20 clusters waveforms having close frequencies and velocities included in the trajectory parameters from among the plurality of peak waveforms (step S25).

When three waveforms close in frequency and velocity included in the trajectory parameter can be selected from among the plurality of peak waveforms (Yes in step S26), the trajectory estimation device 20 estimates the trajectory of the moving body by the trajectory estimation processing using the extracted frequency component (step S27). Details of the trajectory estimation processing will be described later. On the other hand, when it is not possible to select three waveforms having close frequencies and velocities included in the trajectory parameters (No in step S26), the process returns to step S21.

When the process is continued after step S27, the process returns to step S21. When the process is stopped after step S27, the process according to the flowchart of FIG. 19 is ended. The process may be stopped at a timing when trajectory estimation is performed a scheduled number of times, a scheduled processing time elapses, or the process is stopped according to a user operation.

[Trajectory Estimation Processing]

Figure 20:
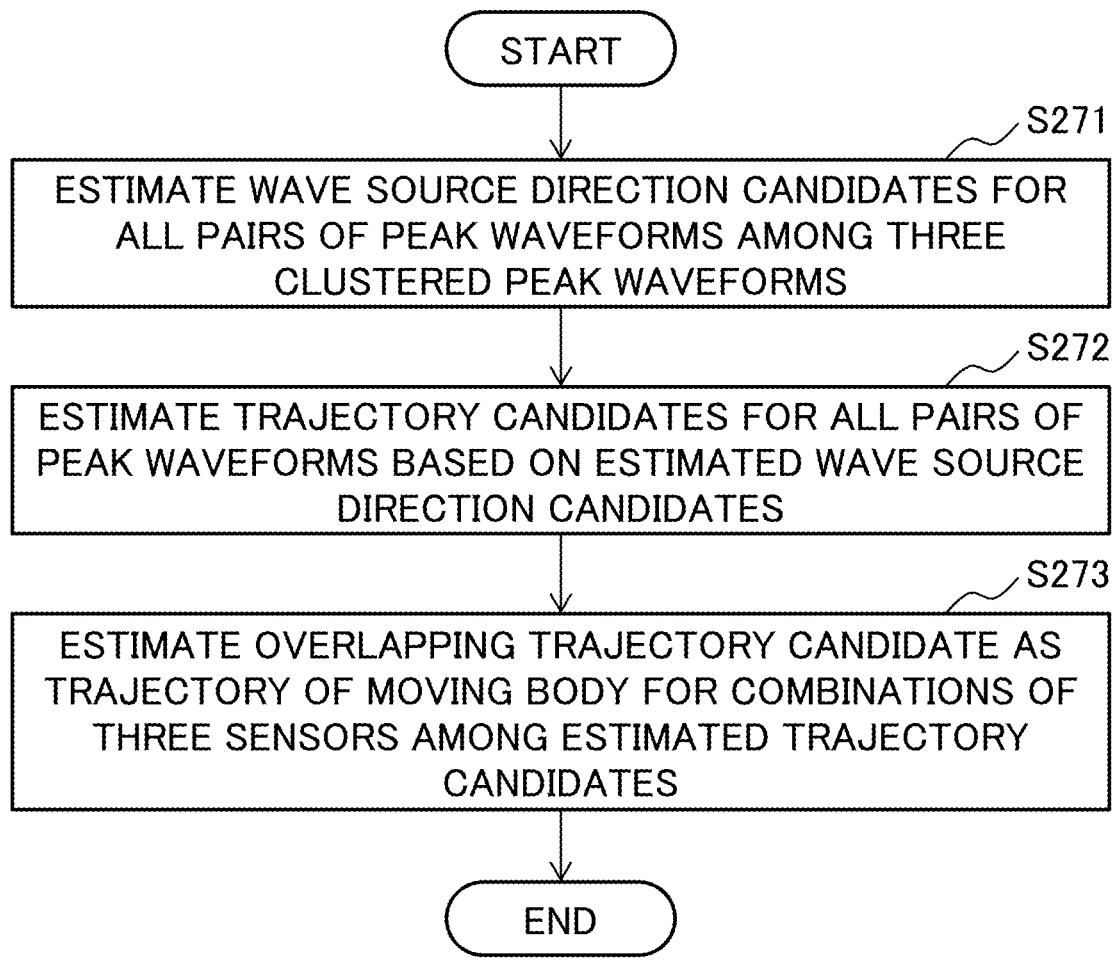
FIG. 20 is a flowchart for explaining an example of trajectory estimation processing by the trajectory estimation device according to the second example embodiment.

Next, the trajectory estimation processing (step S27 in FIG. 19) by the trajectory estimation device 20 will be described with reference to the drawings. FIG. 20 is a flowchart for explaining the trajectory estimation processing. The processing along the flowchart of FIG. 20 will be described with the components (trajectory estimation unit 27) of the trajectory estimation device 20 as the main operation.

In FIG. 20, first, the trajectory estimation unit 27 estimates wave source direction candidates regarding all pairs of peak waveforms among the three clustered peak waveforms (step S271).

Next, the trajectory estimation unit 27 estimates trajectory candidates regarding all pairs of peak waveforms based on the estimated wave source direction candidates (step S272).

Next, the trajectory estimation unit 27 estimates an overlapping trajectory candidate as a trajectory of the moving body for a combination of three sensors among the estimated trajectory candidates (step S273).

For example, the trajectory of the moving body estimated by the trajectory estimation unit 27 is displayed on a screen of a display device (not illustrated). For example, the trajectory of the moving body estimated by the trajectory estimation unit 27 may be output to an arbitrary system that performs processing based on the estimated trajectory, or may be accumulated in a database.

As described above, the trajectory estimation device of the present example embodiment includes the signal input unit, the signal selection unit, the waveform generation unit, the parameter estimation unit, the waveform classification unit, and the trajectory estimation unit. The signal input unit inputs signals based on the waves detected by the plurality of sensors. The signal selection unit selects signals from at least three sensors estimated to be close to the wave source from among the plurality of sensors. The waveform generation unit generates a peak waveform that is time series data of peak frequencies of signals by using signals based on waves detected by at least three sensors. The parameter estimation unit estimates a trajectory parameter relating to a trajectory of a moving body having a wave source of a wave from peak waveforms relating to the waves detected by at least three sensors. The waveform classification unit clusters three peak waveforms in which the velocity of the moving body and the wave frequency are close to one another, from among all the selected peak waveforms relating to the sensors. The trajectory estimation unit estimates a wave source direction candidate for each wave using the trajectory parameter for all combinations of two peak waveforms selected from among the clustered combinations of three peak waveforms. The trajectory estimation unit estimates, as a trajectory of the moving body, trajectory candidates overlapping each other among trajectory candidates estimated based on the wave source direction candidates.

According to the present example embodiment, it is possible to estimate the trajectory of the moving body that emits the wave in the plurality of frequency bands by clustering three peak waveforms having a close velocity of the wave source and a close wave frequency from among all the selected peak waveforms relating to the sensors.

Third Example Embodiment

Next, a trajectory estimation device according to a third example embodiment will be described with reference to the drawings. The trajectory estimation device of the present example embodiment is different from the first and second example embodiments in that a peak waveform derived from noise is removed.

Figure 21:
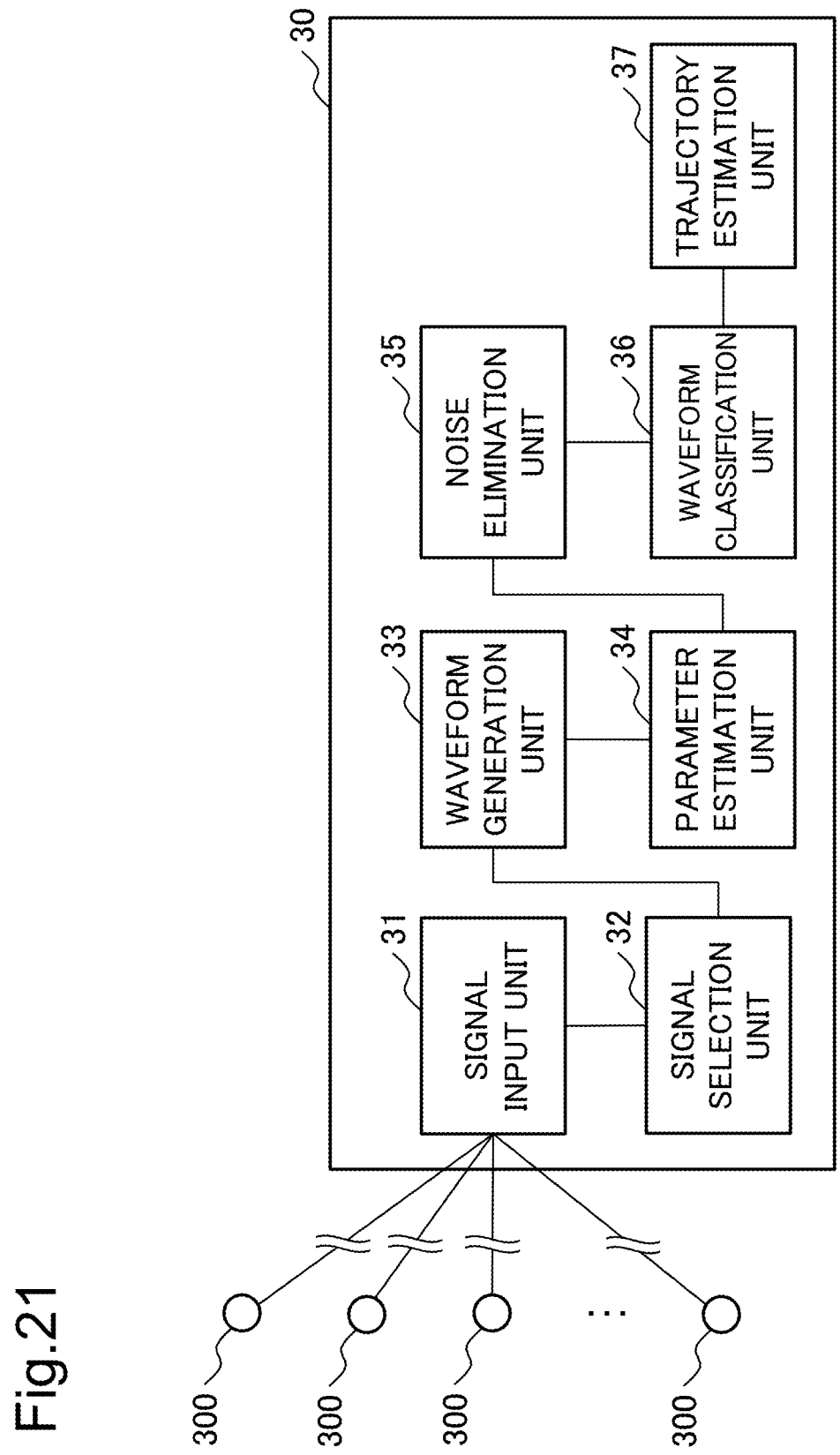
FIG. 21 is a block diagram illustrating an example of a configuration of a trajectory estimation device according to a third example embodiment.

FIG. 21 is a block diagram illustrating an example of a configuration of a trajectory estimation device 30 according to the present example embodiment. The trajectory estimation device 30 includes a signal input unit 31, a signal selection unit 32, a waveform generation unit 33, a parameter estimation unit 34, a noise elimination unit 35, a waveform classification unit 36, and a trajectory estimation unit 37. The signal input unit 31, the signal selection unit 32, the waveform generation unit 33, the parameter estimation unit 34, the waveform classification unit 36, and the trajectory estimation unit 37 have functions similar to those of the relevant configurations of the first and second example embodiments. Hereinafter, the description of the same points as those of the first and second example embodiments will be simplified, and points different from those of the first and second example embodiments will be focused.

The signal input unit 31 acquires a signal based on the waves detected by the plurality of sensors 300. The signal input unit 31 acquires the position of the sensor 300 capable of detecting the wave from the wave source. In a case where the position of the sensor 300 capable of detecting the wave from the wave source is registered in advance in the trajectory estimation device 30, the signal input unit 31 acquires the position of the sensor 300 registered in advance. In a case where the moving body includes a plurality of wave sources, the signal input unit 31 acquires a signal based on the waves from the plurality of wave sources. In a case where the moving body includes a single wave source, the signal input unit 31 acquires a signal based on the wave from the wave source. The signal input unit 31 outputs the acquired signal to the signal selection unit 32. The signal input unit 31 may be connected to the plurality of sensors 300 in a wired manner or in a wireless manner. For example, the signal input unit 31 may be connected to a plurality of sensors 300 via a network (not illustrated).

The signal selection unit 32 selects signals from the three sensors 300 estimated to be close to the moving body from among the plurality of sensors 300. The signal selection unit 32 may be omitted in a case where it is not necessary to select the sensor 300 for a reason such as a case where there are only three sensors 300 capable of detecting the wave generated from the wave source of the moving body or a case where the movement distance from the previous frame is sufficiently small.

The waveform generation unit 33 acquires at least three signals selected by the signal selection unit 32. The waveform generation unit 33 performs Fourier transform on the acquired signal to convert the signal into a frequency domain signal. The waveform generation unit 33 generates a frequency spectrogram using the frequency domain signal for each frame. The waveform generation unit 33 extracts a peak waveform from the generated frequency spectrogram.

Figure 22:
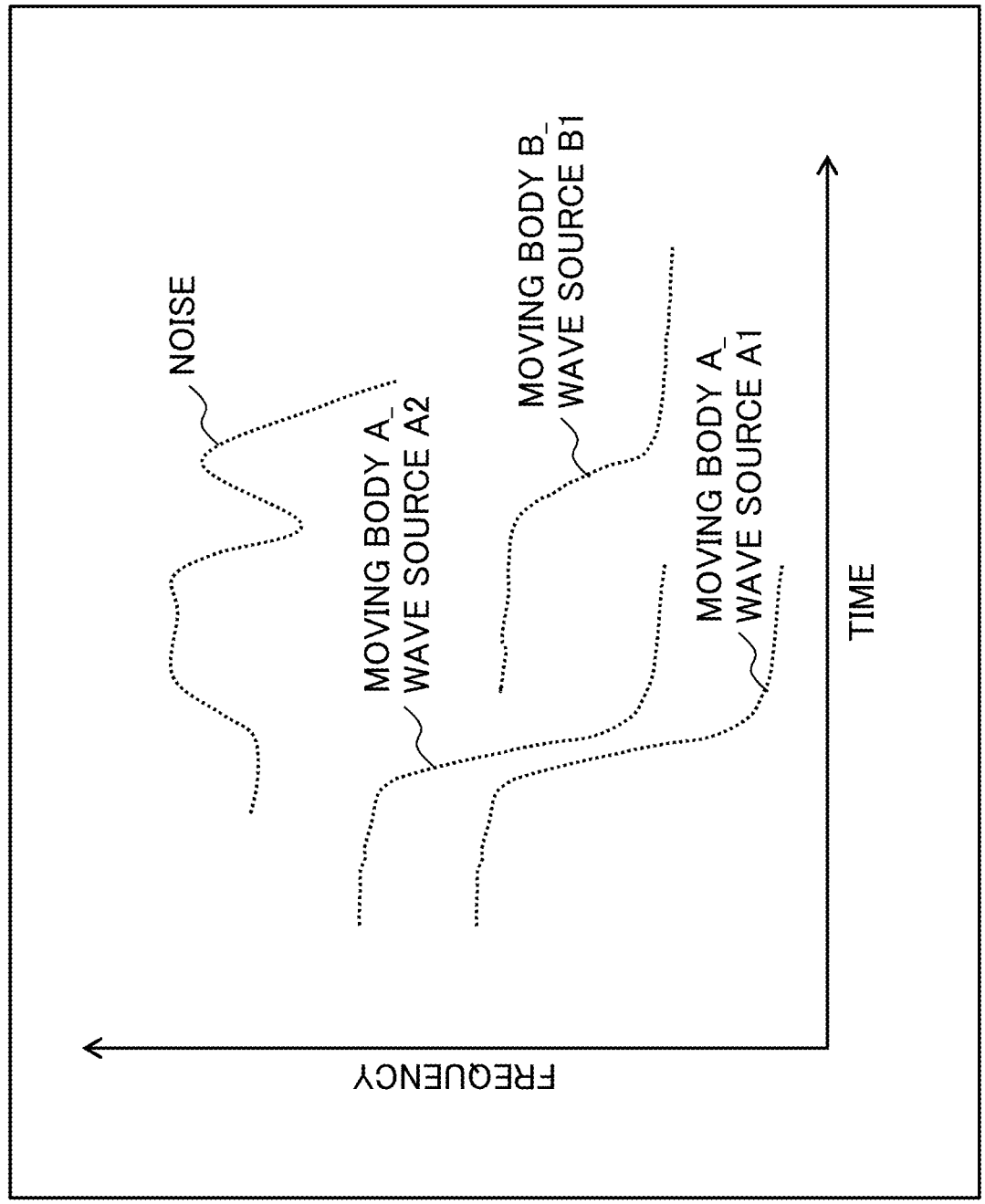
FIG. 22 is a conceptual diagram for explaining a peak waveform generated by the trajectory estimation device according to the third example embodiment.

FIG. 22 is a graph illustrating an example of a peak waveform extracted by the waveform generation unit 33. The peak waveform in FIG. 22 is based on the wave detected by any one of the sensors 300 selected by the signal selection unit 32 among the sensors 300. FIG. 22 illustrates a peak waveform based on the wave from the wave source A1 of the moving body A, a peak waveform based on the wave from the wave source A2 of the moving body A, and a peak waveform based on the wave from the wave source B1 of the moving body B.

The parameter estimation unit 34 fits the extracted peak waveform to the theoretical formula f of the Doppler shift to estimate a parameter (also referred to as a trajectory parameter) relating to the trajectory of the moving body. The parameter estimation unit 34 estimates trajectory parameters such as the velocity v of the moving body having the wave source, the wave frequency $f_0$ generated by the wave source, the shortest distance a between the trajectory of the moving body and the sensor 300, and the time $t_0$ at which the moving body comes closest to the sensor 100. The parameter estimation unit 34 calculates an index representing an error in fitting of the peak waveform with respect to the theoretical formula of the Doppler shift. For example, the parameter estimation unit 34 calculates a root mean square error (RMSE) as an index representing an error in fitting with respect to the theoretical formula of the Doppler shift.

The noise elimination unit 35 eliminates a waveform derived from noise among a plurality of peak waveforms generated by the waveform generation unit 33. For example, the noise elimination unit 35 determines and eliminates a peak waveform in which an error when fitting to the theoretical formula of the Doppler shift calculated by the parameter estimation unit exceeds a predetermined threshold as a waveform caused by noise. For example, the noise elimination unit 35 determines and eliminates a peak waveform in which the RMSE at the time of fitting to the theoretical formula of the Doppler shift exceeds a predetermined threshold as being caused by noise. For example, data obtained by adding noise to the theoretical formula of the Doppler shift is created, and an error when the data to which the noise is added is fitted to the theoretical formula of the Doppler shift may be set to a predetermined threshold. For example, the noise elimination unit 35 may eliminate noise based on not only the RMSE but also a mean total error, a mean square error, or the like. As a result of removing the noise, in a case where no peak waveform related to the Doppler shift remains, the signal input unit 31 inputs the signal again.

The noise elimination unit 35 may determine whether the peak waveform is noise based on an index other than the RMSE when fitting to the theoretical formula of the Doppler shift. For example, the noise elimination unit 35 determines whether the peak waveform is noise based on the shape of the peak waveform. For example, the noise elimination unit 35 may eliminate the waveform caused by the noise among the plurality of peak waveforms using a model obtained by learning the waveform of the Doppler shift based on the waves detected by the plurality of sensors 300. For example, the noise elimination unit 35 may eliminate the waveform caused by the noise among the plurality of peak waveforms using a model obtained by learning the waveform of the noise that can be detected in the space where the sensor 300 is disposed. If the space in which the sensor 300 is disposed is the same, noise that can be detected in the space can be classified. In a case where noise is removed using a model that has learned noise that can be included in a signal input to the signal input unit 31, noise can be eliminated by providing a filter in the signal input unit 31 or the signal selection unit 32. In such a case, the noise elimination unit 35 can be omitted. In a case where it is known in advance that the peak waveform generated by the waveform generation unit 33 does not include a peak waveform caused by noise, the noise elimination unit 35 can be omitted.

The waveform classification unit 36 clusters three waveforms each having the estimated frequency $f_0$ and velocity v close from among the plurality of peak waveforms. When the three waveforms are not selected by the waveform classification unit 36, the signal input unit 31 performs the signal input again. In a case where it is known in advance that a wave of a single frequency band is emitted from a single sound source of a single moving body, the waveform classification unit 36 may be omitted.

The trajectory estimation unit 37 estimates the candidates for the wave source direction (hereinafter, also referred to as wave source direction candidates) for all combinations of two peak waveforms among the three peak waveforms clustered by the waveform classification unit 36. The trajectory estimation unit 37 estimates a candidate of a trajectory (hereinafter, it is also referred to as a trajectory candidate) of the moving body using the estimated wave source direction candidate. The trajectory estimation unit 37 estimates four wave source direction candidates in maximum for a combination of two peak waveforms according to the positional relationship between the two sensors 300 and the trajectory. The trajectory estimation unit 37 estimates three overlapping trajectory candidates as trajectories of the moving body for all sensor pairs (all combinations) among the three sensors 300. For example, the trajectory estimation unit 37 estimates three trajectory candidates overlapping with respect to all combinations of the three sensors 300 as the trajectory R of the moving body.

(Operation)

Figure 23:
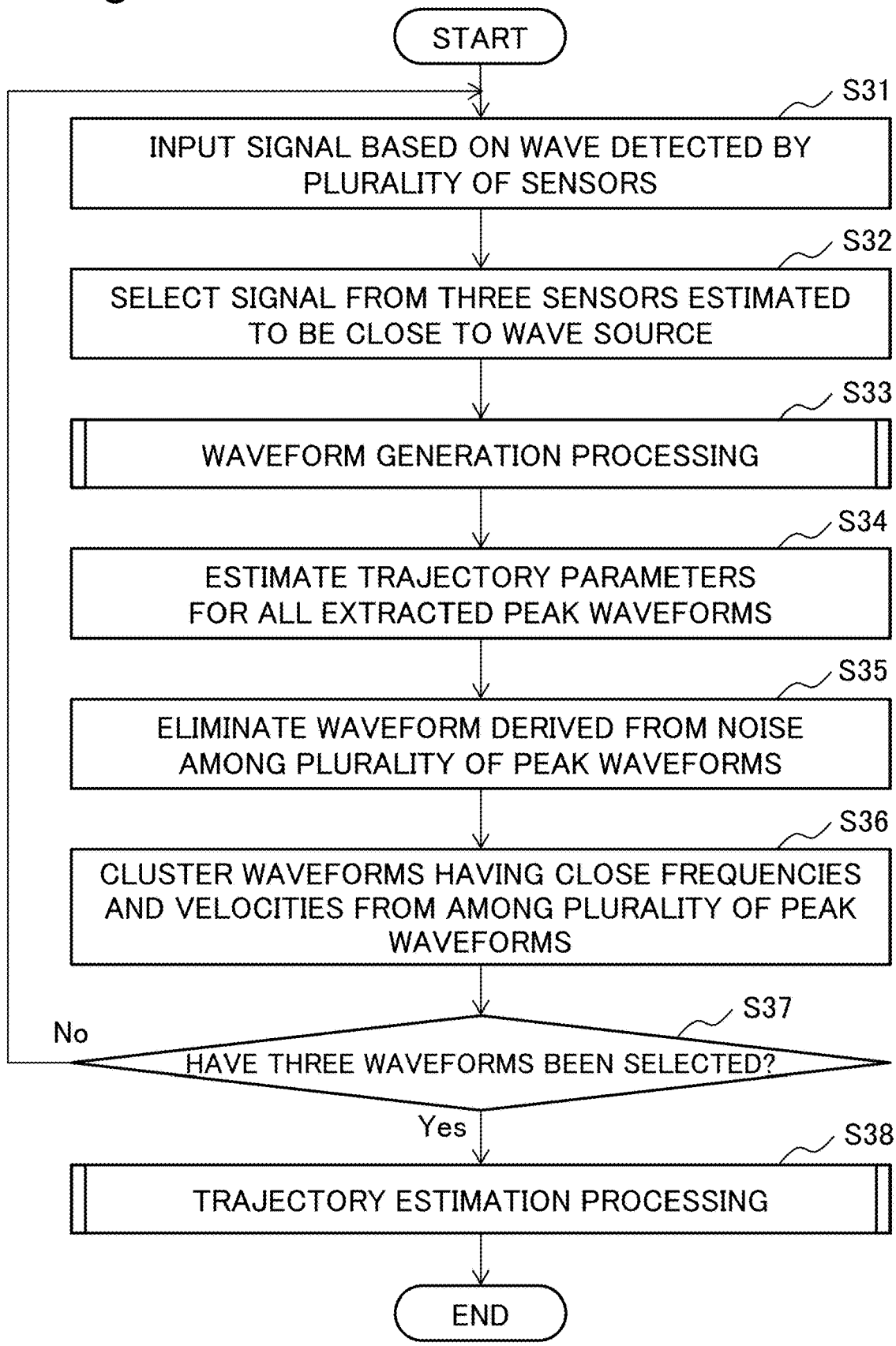
FIG. 23 is a flowchart for explaining an example of an outline of an operation of the trajectory estimation device according to the third example embodiment.

Next, an operation of the trajectory estimation device 30 of the present example embodiment will be described with reference to the drawings. FIG. 23 is a flowchart for explaining an outline of the operation of the trajectory estimation device 30. FIG. 23 relates to an operation for one frame. The processing along the flowchart of FIG. 23 will be described with the trajectory estimation device 30 as the main operation.

In FIG. 23, first, the trajectory estimation device 30 acquires a signal based on the waves detected by the plurality of sensors 300 (step S31).

Next, the trajectory estimation device 30 selects signals from at least three sensors estimated to be close to the moving body (step S32).

Next, the trajectory estimation device 30 generates peak waveforms regarding all the selected signals by waveform generation processing (step S33). Since the waveform generation processing by the trajectory estimation device 30 is similar to that of the first example embodiment (FIG. 14), detailed description thereof will be omitted.

Next, the trajectory estimation device 30 fits all the extracted peak waveforms to the theoretical formula of the Doppler shift to estimate the trajectory parameters (step S34).

Next, the trajectory estimation device 30 eliminates a waveform derived from noise among the plurality of peak waveforms (step S35). For example, the trajectory estimation device 30 determines and eliminates a peak waveform in which an error in fitting to the theoretical formula of the Doppler shift exceeds a predetermined threshold as a waveform caused by noise.

Next, the trajectory estimation device 30 clusters waveforms having close frequencies and velocities included in the trajectory parameters from among the plurality of peak waveforms (step S36).

When three waveforms close in frequency and velocity included in the trajectory parameter can be selected from among the plurality of peak waveforms (Yes in step S37), the trajectory estimation device 30 estimates the trajectory of the moving body by the trajectory estimation processing using the extracted frequency component (step S38). Details of the trajectory estimation processing will be omitted. On the other hand, when it is not possible to select three waveforms having close frequencies and velocities included in the trajectory parameters (No in step S37), the process returns to step S31.

When the process is continued after step S38, the process returns to step S31. When the process is stopped after step S38, the process according to the flowchart of FIG. 23 is ended. The process may be stopped at a timing when trajectory estimation is performed a scheduled number of times, a scheduled processing time elapses, or the process is stopped according to a user operation.

As described above, the trajectory estimation device of the present example embodiment includes the signal input unit, the signal selection unit, the waveform generation unit, the parameter estimation unit, the noise elimination unit, the waveform classification unit, and the trajectory estimation unit. The signal input unit inputs signals based on the waves detected by the plurality of sensors. The signal selection unit selects signals from at least three sensors estimated to be close to the wave source from among the plurality of sensors. The waveform generation unit generates a peak waveform that is time series data of peak frequencies of signals by using signals based on waves detected by at least three sensors. The parameter estimation unit estimates a trajectory parameter relating to a trajectory of a moving body having a wave source of a wave from peak waveforms relating to the waves detected by at least three sensors. The noise elimination unit eliminates a peak waveform derived from noise among peak waveforms relating to the waves detected by at least three sensors. The waveform classification unit clusters three peak waveforms in which the velocity of the moving body and the wave frequency are close to one another, from among at least three peak waveforms. The trajectory estimation unit estimates a wave source direction candidate for each wave using the trajectory parameter for all combinations of two peak waveforms selected from among the clustered combinations of three peak waveforms. The trajectory estimation unit estimates, as a trajectory of the moving body, trajectory candidates overlapping each other among trajectory candidates estimated based on the wave source direction candidates.

According to the trajectory estimation device of the present example embodiment, it is possible to improve the estimation accuracy of the trajectory of the moving body having the wave source by removing the peak waveform caused by the noise.

In one aspect of the present example embodiment, the parameter estimation unit calculates an index representing an error in fitting of a theoretical formula of the Doppler shift to the peak waveform. The noise elimination unit eliminates a waveform derived from noise among peak waveforms relating to a wave detected by the sensor based on an index representing an error in fitting. According to the present aspect, the estimation accuracy of the trajectory of the moving body can be improved by removing the noise based on the index representing the error in fitting of the peak waveform with respect to the theoretical formula of the Doppler shift.

Fourth Example Embodiment

Figure 24:
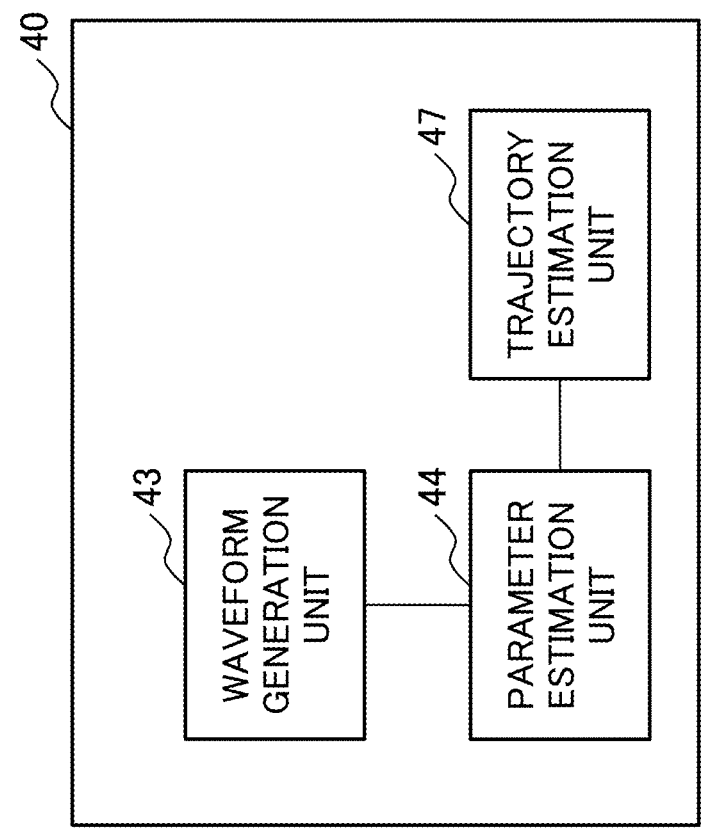
FIG. 24 is a block diagram illustrating an example of a configuration of a trajectory estimation device according to a fourth example embodiment.

Next, a trajectory estimation device according to a fourth example embodiment will be described with reference to the drawings. The trajectory estimation device of the present example embodiment has a configuration in which the trajectory estimation devices according to the first to third example embodiments are simplified. FIG. 24 is a block diagram illustrating an example of a configuration of a trajectory estimation device 40 according to the present example embodiment. The trajectory estimation device 40 includes a waveform generation unit 43, a parameter estimation unit 44, and a trajectory estimation unit 47.

The waveform generation unit 43 generates a peak waveform which is time series data of a peak frequencies of signals by using signals based on waves detected by at least three sensors. The parameter estimation unit 44 estimates a trajectory parameter relating to a trajectory of a moving body having a wave source of a wave from peak waveforms relating to the waves detected by at least three sensors. The trajectory estimation unit 47 estimates a wave source direction candidate for each wave using the trajectory parameter for all combinations of two peak waveforms selected from among combinations of at least three peak waveforms. The trajectory estimation unit 47 estimates, as a trajectory of the moving body, trajectory candidates overlapping each other among trajectory candidates estimated based on the wave source direction candidates.

According to the trajectory estimation device of the present example embodiment, it is possible to estimate the trajectory of the moving body having the wave source by estimating, as the trajectory of the moving body, trajectory candidates overlapping each other among trajectory candidates estimated based on the waves detected by at least three sensors.

(Hardware)

Here, a hardware configuration for executing processing of the trajectory estimation device according to each example embodiment of the present invention will be described using an information processing device 90 of FIG. 25 as an example. The information processing device 90 in FIG. 25 is a configuration example for executing processing of the trajectory estimation device of each example embodiment, and does not limit the scope of the present invention.

Figure 25:
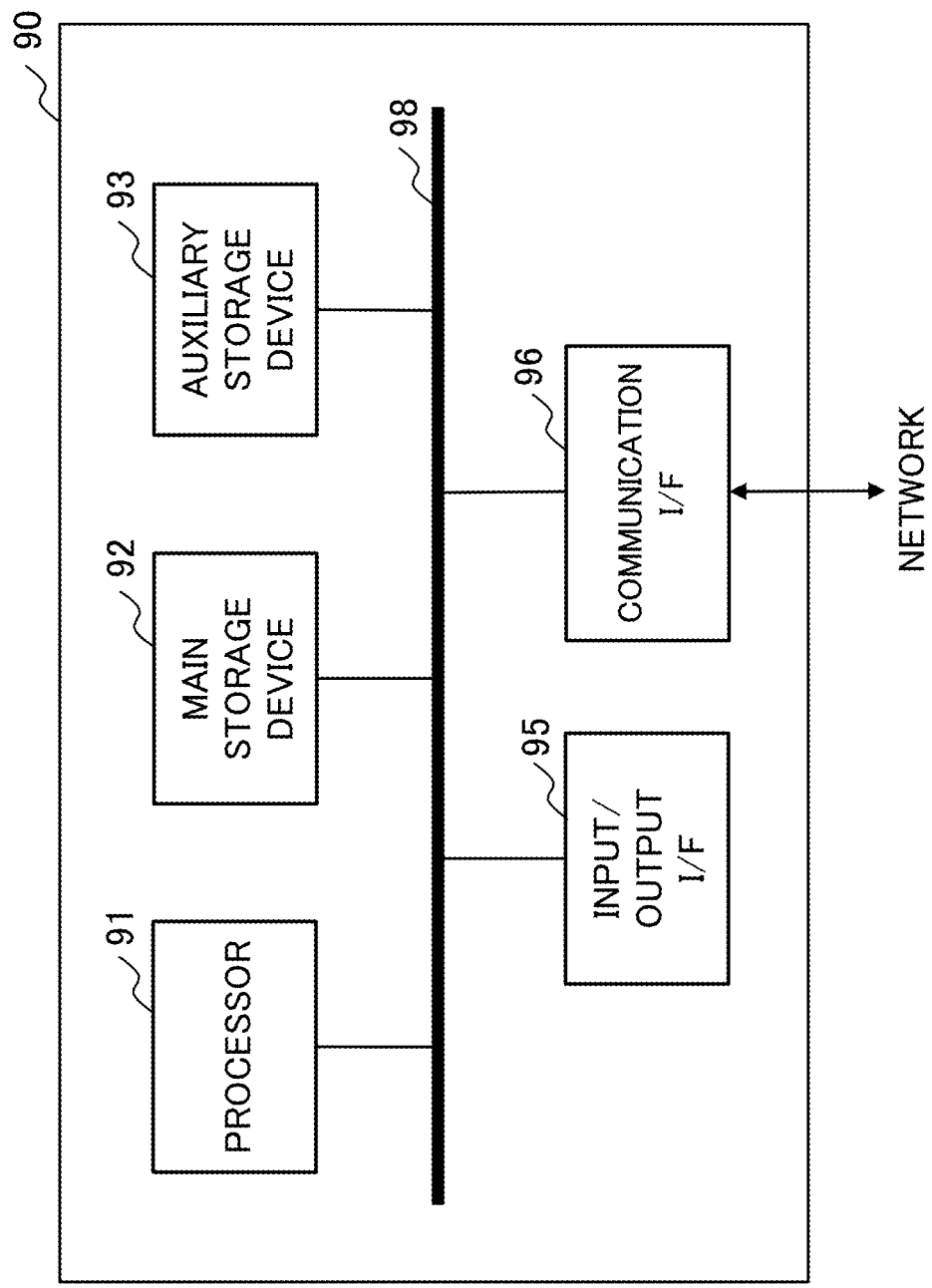
FIG. 25 is a block diagram illustrating an example of a hardware configuration for achieving the trajectory estimation device according to each example embodiment.

As illustrated in FIG. 25, the information processing device 90 includes a processor 91, a main storage device 92, an auxiliary storage device 93, an input/output interface 95, and a communication interface 96. In FIG. 25, the interface is abbreviated as an I/F. The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program stored in the auxiliary storage device 93 or the like in the main storage device 92 and executes the developed program. In the present example embodiment, a software program installed in the information processing device 90 may be used. The processor 91 executes processing by the trajectory estimation device according to the present example embodiment.

The main storage device 92 has an area in which a program is developed. The main storage device 92 may be a volatile memory such as a dynamic random access memory (DRAM). A nonvolatile memory such as a magnetoresistive random access memory (MRAM) may be configured and added as the main storage device 92.

The auxiliary storage device 93 stores various data. The auxiliary storage device 93 includes a local disk such as a hard disk or a flash memory. Various data may be stored in the main storage device 92, and the auxiliary storage device 93 may be omitted.

The input/output interface 95 is an interface for connecting the information processing device 90 and a peripheral device. The communication interface 96 is an interface for connecting to an external system or device through a network such as the Internet or an intranet based on a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input information and settings. When the touch panel is used as an input device, the display screen of the display device may also serve as the interface of the input device. Data communication between the processor 91 and the input device may be mediated by the input/output interface 95.

The information processing device 90 may be provided with a display device for displaying information. In a case where a display device is provided, the information processing device 90 preferably includes a display control device (not illustrated) for controlling display of the display device. The display device may be connected to the information processing device 90 via the input/output interface 95.

The information processing device 90 may be provided with a drive device. The drive device mediates reading of data and a program from a recording medium, writing of a processing result of the information processing device 90 to the recording medium, and the like between the processor 91 and the recording medium (program recording medium). The drive device may be connected to the information processing device 90 via the input/output interface 95.

The above is an example of the hardware configuration for enabling the trajectory estimation device according to each example embodiment of the present invention. The hardware configuration of FIG. 25 is an example of a hardware configuration for executing arithmetic processing of the trajectory estimation device according to each example embodiment, and does not limit the scope of the present invention. A program for causing a computer to execute processing regarding the trajectory estimation device according to each example embodiment is also included in the scope of the present invention. Further, a program recording medium in which the program according to each example embodiment is recorded is also included in the scope of the present invention. The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card, a magnetic recording medium such as a flexible disk, or another recording medium. When a program executed by the processor is recorded in a recording medium, the recording medium is associated to a program recording medium.

The components of the trajectory estimation device in each example embodiment can be arbitrarily combined. The components of the trajectory estimation device of each example embodiment may be implemented by software or may be implemented by a circuit.

Although the present invention has been described with reference to the embodiments, the present invention is not limited to the above embodiments. Various modifications that can be understood by those skilled in the art can be made to the configuration and details of the present invention within the scope of the present invention.

REFERENCE SIGNS LIST 10, 20, 30, 40 trajectory estimation device
11, 21, 31 signal input unit
12, 22, 32 signal selection unit
13, 23, 33, 43 waveform generation unit
14, 24, 34, 44 parameter estimation unit
17, 27, 37, 47 trajectory estimation unit
26 waveform classification unit
35 noise elimination unit
100, 200, 300 sensor

What is claimed is:

1. A trajectory estimation device comprising:
at least one memory storing instructions; and
at least one processor connected to the at least one memory and configured to execute the instructions to:
generate, by using signals based on waves detected by at least three sensors to, peak waveforms consisting of time series data of peak frequencies of the signals;
estimate, from the peak waveforms relating to the waves detected by the at least three sensors, a trajectory parameter relating to a trajectory of a moving body having a wave source of the waves; and estimate, for all combinations of two of the peak waveforms selected from among combinations of at least three of the peak waveforms, a wave source direction candidate for each of the waves by using the trajectory parameter, and estimate, as a trajectory of the moving body, overlapping trajectory candidates from among trajectory candidates estimated based on the wave source direction candidates.

2. The trajectory estimation device according to claim 1, wherein the at least one processor is configured to execute the instructions to estimate, by fitting a theoretical formula of a Doppler shift to the peak waveforms, the trajectory parameter including a velocity of the moving body, a wave frequency generated by the wave source, a shortest distance between the moving body and the sensor, and a time when the moving body comes closest to the sensor.

3. The trajectory estimation device according to claim 2, wherein the at least one processor is configured to execute the instructions to cluster three of the peak waveforms in which the velocity of the moving body and the wave frequency are close to one another, from among all the selected peak waveforms of the sensors, and estimate, for all combinations of two of the peak waveforms selected from among combinations of the clustered three peak waveforms, the wave source direction candidate for each of the waves by using the trajectory parameter.

4. The trajectory estimation device according to claim 2, wherein a noise elimination means the at least one processor is configured to execute the instructions to eliminate a peak waveform derived from noise, among the peak waveforms relating to the waves detected by the sensors.

5. The trajectory estimation device according to claim 4, wherein the at least one processor is configured to execute the instructions to calculate an index representing an error in fitting of the theoretical formula of the Doppler shift to the peak waveform, and eliminate a waveform derived from noise, among the peak waveforms relating to the waves detected by the sensors, based on the index representing an error in the fitting.

6. The trajectory estimation device according to claim 1, wherein the at least one processor is configured to execute the instructions to generate a frequency spectrogram by using the signals based on the waves detected by the sensors, and generate time series data of peak frequencies extracted from the generated frequency spectrogram as the peak waveform.

7. The trajectory estimation device according to comprising claim 1, wherein the at least one processor is configured to execute the instructions to estimate a position of the moving body in a current verification frame based on a position of the moving body estimated in a previous frame, and select the signals based on the waves detected by the at least three sensors close to the estimated position of the moving body, and generate the peak waveform that is time series data of peak frequencies of the selected signals by using the signals based on the waves detected by the at least three sensors.

8. A trajectory estimation system comprising:

the trajectory estimation device according to claim 1; and at least three sensors that detect waves and output signals based on the detected waves to the trajectory estimation device.

9. A trajectory estimation method for causing a computer to execute:

generating, by using signals based on waves detected by at least three sensors, peak waveforms consisting of time series data of peak frequencies of the signals;

estimating, from the peak waveforms relating to the waves detected by the at least three sensors, a trajectory parameter relating to a trajectory of a moving body having a wave source of the waves;

estimating, for all combinations of two of the peak waveforms selected from among combinations of at least three of the peak waveforms, a wave source direction candidate for each of the waves by using the trajectory parameter; and estimating, as a trajectory of the moving body, overlapping trajectory candidates from among trajectory candidates estimated based on the wave source direction candidates.

10. A non-transitory program recording medium having stored therein a program for causing a computer to execute:

generating, by using signals based on waves detected by at least three sensors, peak waveforms consisting of time series data of peak frequencies of the signals;

estimating, from the peak waveforms relating to the waves detected by the at least three sensors, a trajectory parameter relating to a trajectory of a moving body having a wave source of the waves;

estimating, for all combinations of two of the peak waveforms selected from among combinations of at least three of the peak waveforms, a wave source direction candidate for each of the waves by using the trajectory parameter; and estimating, as a trajectory of the moving body, overlapping trajectory candidates from among trajectory candidates estimated based on the wave source direction candidates.

* * * * *